(12) United States Patent
Yamanobe

(10) Patent No.: US 8,511,815 B2
(45) Date of Patent: Aug. 20, 2013

(54) IMAGE FORMING APPARATUS AND METHOD

(75) Inventor: Jun Yamanobe, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 172 days.

(21) Appl. No.: 12/405,774

(22) Filed: Mar. 17, 2009

(65) Prior Publication Data

US 2009/0237442 A1 Sep. 24, 2009

(30) Foreign Application Priority Data

Mar. 18, 2008 (JP) ................................. 2008-070267

(51) Int. Cl.
*B41J 2/165* (2006.01)
(52) U.S. Cl.
USPC ........................................................ 347/101
(58) Field of Classification Search
None
See application file for complete search history.

(56) References Cited

U.S. PATENT DOCUMENTS

| | | | |
|---|---|---|---|
| 7,222,956 B2* | 5/2007 | Yokouchi et al. | 347/107 |
| 2002/0060728 A1 | 5/2002 | Koizumi et al. | |
| 2005/0073566 A1 | 4/2005 | Shimoda et al. | |
| 2006/0139425 A1* | 6/2006 | Tsuchimura et al. | 347/95 |
| 2006/0214970 A1* | 9/2006 | Hirakawa | 347/15 |
| 2007/0176960 A1 | 8/2007 | Tsuruko | |
| 2008/0018695 A1* | 1/2008 | Kadomatsu et al. | 347/21 |
| 2008/0055381 A1* | 3/2008 | Doi et al. | 347/103 |

FOREIGN PATENT DOCUMENTS

| | | |
|---|---|---|
| EP | 0 798 120 A1 | 10/1997 |
| JP | 3-92351 A | 4/1991 |
| JP | 2004-142291 A | 5/2004 |
| JP | 2005-232633 A | 9/2005 |

* cited by examiner

*Primary Examiner* — Matthew Luu
*Assistant Examiner* — Alejandro Valencia
(74) *Attorney, Agent, or Firm* — Birch, Stewart, Kolasch & Birch, LLP.

(57) ABSTRACT

The image forming apparatus forms an image on a surface of a recording medium by using ink and treatment liquid. The ink contains coloring material, and the treatment liquid contains at least one of a component which aggregates the coloring material and a component which increases viscosity of the ink. The image forming apparatus includes: a repellent agent deposition device which deposits a repellent agent onto the recording medium to render the surface of the recording medium liquid-repellent; a treatment liquid droplet ejection device which ejects and deposits droplets of the treatment liquid onto the recording medium on which the repellent agent has been deposited; and an ink droplet ejection device which ejects and deposits droplets of the ink onto the recording medium on which the droplets of the treatment liquid have been deposited.

2 Claims, 14 Drawing Sheets

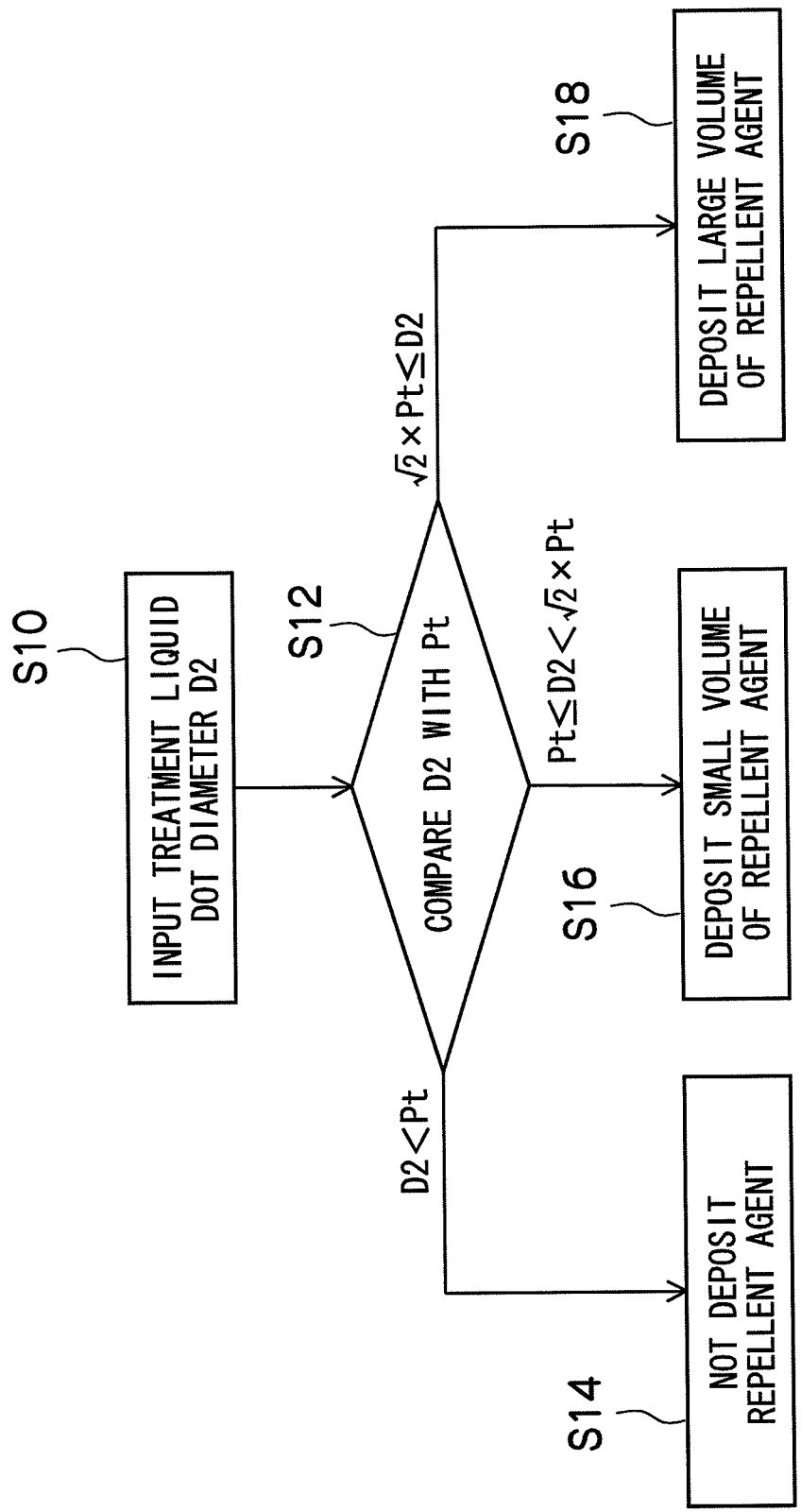

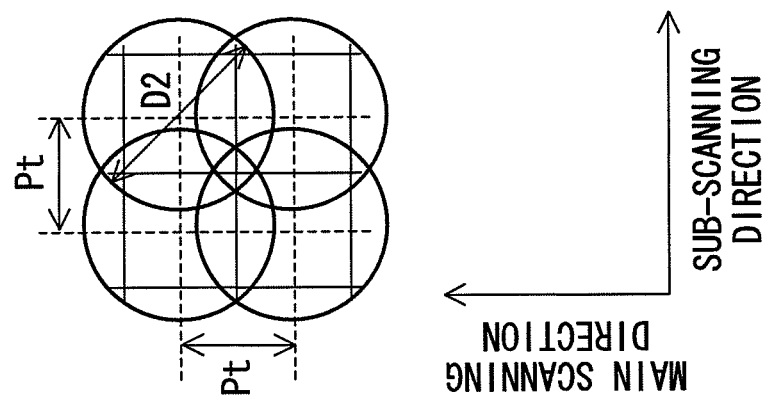
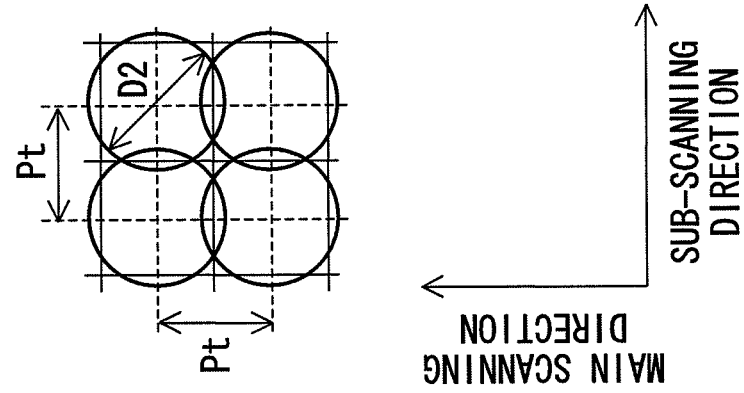
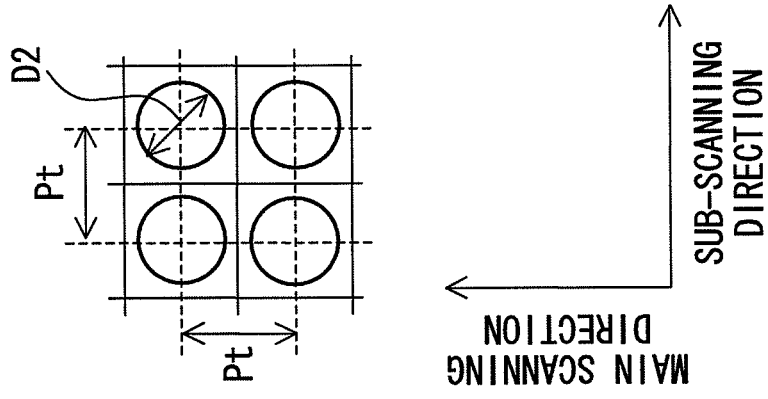

FIG.8
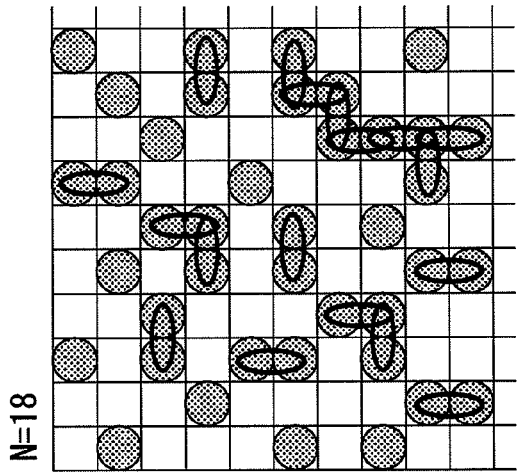
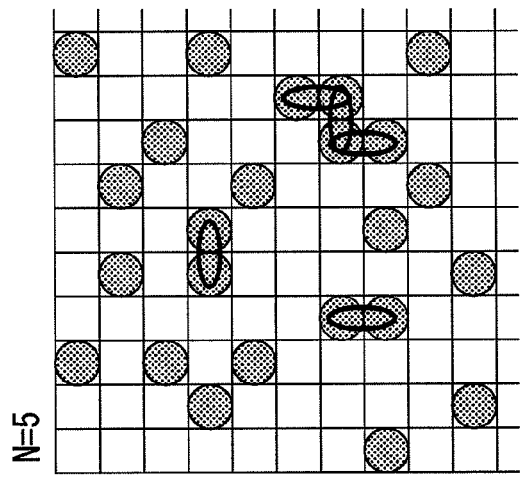
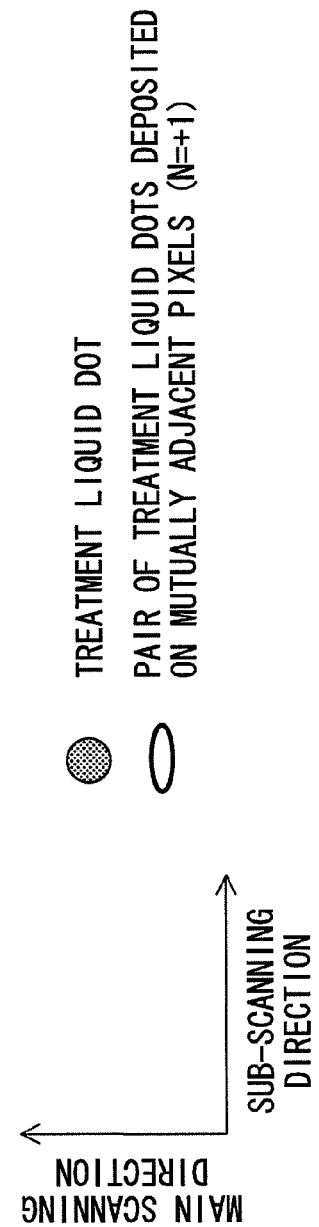

FIG.9
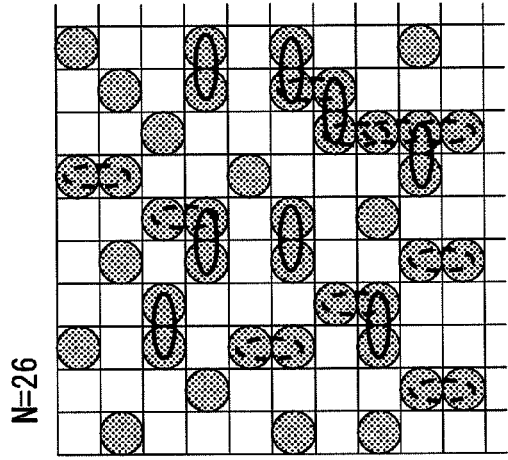
EXAMPLE D
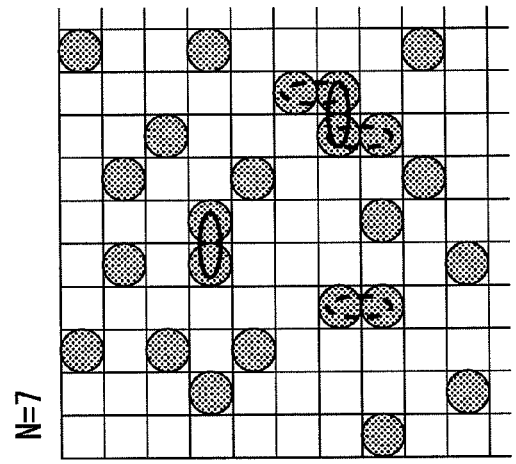
EXAMPLE C
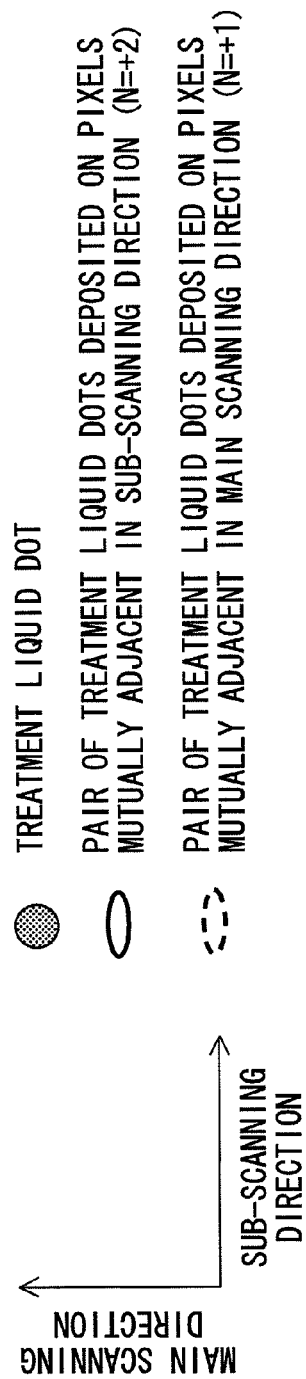

IMAGE FORMING APPARATUS AND METHOD

BACKGROUND OF THE INVENTION

1. Field of the Invention

The present invention relates to an image forming apparatus and an image forming method, and more particularly to an image forming apparatus and an image forming method in which an image is formed on a recording medium by using an ink and a treatment agent.

2. Description of the Related Art

In the inkjet recording system, the recording is performed by ejecting and depositing ink droplets onto a recording medium from a plurality of nozzles formed in an inkjet head. The inkjet recording system is able to record images of high resolution and high quality, with little noise during the recording operation and low running costs. The ink ejection method can be, for example, a piezoelectric method, which uses the displacement of a piezoelectric element, or a thermal method, which uses thermal energy generated by a heating element, or the like.

In the inkjet recording system, dots (hereinafter referred to as "ink dots") formed of ink droplets deposited on the recording medium produce bleeding and hence there is a problem in that the printing properties decline markedly. In order to solve this problem, there is widely known technology which previously deposits a liquid (treatment liquid) containing a component that reacts with the coloring material (pigment or dye) in the ink and causes the coloring material to aggregate or increases the viscosity of the ink itself, and subsequently deposits ink droplets. The methods for depositing the treatment liquid can be divided broadly into methods that apply the treatment liquid by using an application roller, or the like, and methods that eject droplets of the treatment liquid by using an inkjet head. The latter type of method is preferable since it allows the droplets of the treatment liquid to be deposited selectively at the positions where the ink droplets are to be deposited (the ink droplet deposition positions).

However, if droplets of the treatment liquid are deposited by means of the inkjet recording system, then dots (hereinafter referred to as "treatment liquid dots") formed of the treatment liquid droplets that are deposited onto the recording medium combine with each other on the surface of the recording medium, and hence there arises a problem of non-uniformity of the treatment liquid on the recording medium. If non-uniformity arises in the treatment liquid, then the reaction with the ink becomes non-uniform and this gives rise to decline in image quality.

Japanese Patent Application Publication No. 2004-142291 discloses technology for a method of forming images on a recording medium by using ink (a first liquid composition) and a treatment liquid (a second liquid composition), wherein the surface tension of the treatment liquid is increased and the treatment liquid droplets are deposited in a thinned out fashion in such a manner that the respective dots of the treatment liquid do not make contact with each other on the recording medium. Nevertheless, this involves the following problems (1) to (3).

(1) When droplets of the treatment liquid are deposited in a thinned out fashion, then the amount of the reactive agent (treatment liquid) is reduced and hence there is a problem in that the reactivity with the ink becomes worse. For example, if a line is printed in an oblique direction, then droplets of the treatment liquid are not deposited completely onto the pixels that correspond to the edge portions of the line, and hence there is severe bleeding of the line.

FIG. 14 is an illustrative diagram showing an example of the droplet deposition positions of the treatment liquid and the ink in the related art. Here, a case is described in which the droplet deposition density of the treatment liquid is thinned out at a rate of 1/2 with respect to the droplet deposition density of the ink (for example, the droplet deposition density of the ink is set to 1200 dpi and the droplet deposition density of the treatment liquid is set to 600 dpi). In other words, if all of the pixels shown in FIG. 14 are set as droplet deposition positions for the ink droplets, then the pixels applied with the hatching (the hatched pixels) are the droplet deposition positions of the treatment liquid droplets. Here, it is supposed that treatment liquid droplets are deposited in a case where ink droplet deposition data (ink dot data) is present at the droplet deposition positions of the treatment liquid droplets (hatched pixels) set as described above. Under these droplet deposition conditions, if a line is formed in an oblique direction as shown in FIG. 14, then although the treatment liquid droplets are deposited at the positions of the ink dots 900 in the central portion of the line (the solid circles in the drawing), no treatment liquid droplets are deposited at the positions of the ink dots 902 in the edge portions of the line (the hollow circles in the drawing). Consequently, it is not possible for the ink droplets that have been deposited on the edge portions of the line to react with the treatment liquid droplets, and hence, the edge portions of the line suffer bleeding and the image quality declines.

If treatment liquid droplets are simply deposited in a thinned out fashion in this way, then problems may occur, depending on the image. In order to avoid this, for example, edge portions must be extracted when creating the dot data for the treatment liquid, and hence the load on the system increases.

(2) The surface tension of the treatment liquid is made greater than the surface tension of the ink, but if the treatment liquid and the ink have different surface tensions, then it is necessary to prepare respective waveforms for driving actuators to eject droplets of the treatment liquid and the ink, and hence the system becomes more complicated and costs increase.

(3) As shown in FIG. 15, if a layer of treatment liquid (treatment liquid layer) 912 is present on the recording medium 910, then the droplets of ink 914 that have been deposited float about in the treatment liquid layer 912, thus causing the ink coloring material (ink dots) 916 to move, and as a result, there is a problem in that the output image is greatly disturbed in comparison with the desired image. The problems described above are especially grave in cases where a recording medium having a surface coating (for example, coated printing paper, or art paper, etc.) is used, or cases where the time period (interval) from the deposition of the treatment liquid droplets until the deposition of the ink droplets is shorter than the permeation time of the treatment liquid into the recording medium.

SUMMARY OF THE INVENTION

The present invention has been contrived in view of the circumstances described above, an object thereof being to provide an image forming apparatus and an image forming method whereby, in a two-liquid aggregating system that uses ink and treatment liquid, landing interference between droplets of the treatment liquid deposited on the recording medium is prevented, and images of high quality can be formed.

In order to attain the aforementioned object, the present invention is directed to an image forming apparatus which for ns an image on a surface of a recording medium by using ink and treatment liquid, the ink containing coloring material, the treatment liquid containing at least one of a component which aggregates the coloring material and a component which increases viscosity of the ink, the apparatus comprising: a repellent agent deposition device which deposits a repellent agent onto the recording medium to render the surface of the recording medium liquid-repellent; a treatment liquid droplet ejection device which ejects and deposits droplets of the treatment liquid onto the recording medium on which the repellent agent has been deposited; and an ink droplet ejection device which ejects and deposits droplets of the ink onto the recording medium on which the droplets of the treatment liquid have been deposited.

According to this aspect of the present invention, by rendering the surface of the recording medium liquid-repellent before depositing the droplets of the treatment liquid, it is possible to suppress the wetting and spreading of the treatment liquid droplets (treatment liquid dots) that have landed on the recording medium, and therefore it is possible to prevent landing interference between the droplets of the treatment liquid. Thus, it is also possible to deposit the droplets of the treatment liquid at the same droplet deposition density as the ink droplets, rather than thinning out the treatment liquid droplets, and hence an image of high quality which does not contain image bleeding can be achieved.

Preferably, the image forming apparatus further comprises a treatment liquid drying device which dries the treatment liquid having been deposited on the recording medium thereby rendering the treatment liquid one of solid and semi-solid before the droplets of the ink are deposited.

It is preferable that the droplets of the ink are deposited after forming a solid or semi-solid aggregating treatment agent layer (a thin film layer of dried treatment liquid). It is thereby possible to prevent image deterioration caused by movement of the coloring material and hence a high-quality image can be formed.

In the present specification, the term of "solid or semi-solid aggregating treatment agent (aggregating treatment agent layer)" includes an aggregating treatment agent (aggregating treatment agent layer) having a solvent content rate of 0% to 70%, where the solvent content rate is defined as a ratio $((X_2/X_1) \times 100)$ of a weight $X_2$ $(g/m^2)$ per unit surface area of solvent contained in the aggregating treatment agent to a weight $X_1$ $(g/m^2)$ per unit surface area of the aggregating treatment agent.

In the present specification, the term of "aggregating treatment agent" broadly includes the aggregating treatment agent of the solid or semi-solid state and the aggregating treatment agent in a liquid state. In particular, the aggregating treatment agent in the liquid state of which the solvent content rate is not less than 70% is referred to as an "aggregating treatment liquid".

Preferably, the droplets of the treatment liquid deposited by the treatment liquid droplet ejection device form dots of the treatment liquid on the recording medium; and none of the dots of the treatment liquid is in contact with another of the dots adjacent in at least one direction.

According to this aspect of the present invention, since the treatment liquid dots on the recording medium do not make contact with each other in two dimensions, then it is possible to reduce non-uniformity of the treatment liquid.

Preferably, the droplets of the treatment liquid deposited by the treatment liquid droplet ejection device form dots of the treatment liquid on the recording medium; and the dots of the treatment liquid are not in contact with each other.

According to this aspect of the present invention, it is possible to prevent landing interference between the treatment liquid droplets (treatment liquid dots) deposited onto the recording medium.

Preferably, the droplets of the treatment liquid deposited by the treatment liquid droplet ejection device form dots of the treatment liquid on the recording medium; the ink droplet ejection device ejects and deposits the droplets of the ink of a plurality of colors; the droplets of the ink deposited by the ink droplet ejection device form dots of the ink of the plurality of colors on the recording medium; and dot data for the droplets of the treatment liquid deposited by the treatment liquid droplet ejection device is a logical sum of dot data for the droplets of the ink of the plurality of colors deposited by the ink droplet ejection device.

According to this aspect of the present invention, it is possible to reduce the system load required for creating the treatment liquid dot data.

Preferably, the image forming apparatus further comprises a repellent agent deposition control device which controls a deposition volume of the repellent agent deposited by the repellent agent deposition device.

According to this aspect of the present invention, it is possible to optimize the state (and in particular, the dot diameter) of the treatment liquid droplets (treatment liquid dots) which have landed on the recording medium.

Preferably, the droplets of the treatment liquid deposited by the treatment liquid droplet ejection device form dots of the treatment liquid on the recording medium; and the repellent agent deposition control device controls the deposition volume of the repellent agent in such a manner that the dots of the treatment liquid are not in contact with each other.

According to this aspect of the present invention, it is possible to prevent landing interference between the treatment liquid droplets on the recording medium.

Preferably, the repellent agent deposition control device controls the deposition volume of the repellent agent in accordance with a type of the recording medium.

According to this aspect of the present invention, it is possible to prevent landing interference between the treatment liquid droplets, regardless of the type of recording medium.

Preferably, the image forming apparatus further comprises: a wettability parameter input device which inputs a wettability parameter specifying wettability of the treatment liquid with respect to the recording medium, wherein the repellent agent deposition control device controls the deposition volume of the repellent agent in accordance with the wettability parameter.

Possible parameters for use as the wettability parameter include, for example, the angle of contact of the treatment liquid droplet on the recording medium, the diameter of the treatment liquid droplet that has landed on the recording medium (treatment liquid dot diameter), and the spreading rate of the treatment liquid droplet (the ratio between the diameter of the treatment liquid droplet in flight (converted to a spherical shape) and the diameter of the treatment liquid droplet when it has landed on the recording medium).

Preferably, the droplets of the treatment liquid deposited by the treatment liquid droplet ejection device form dots of the treatment liquid on the recording medium; and the repellent agent deposition control device controls the deposition volume of the repellent agent in accordance with dot data for the droplets of the treatment liquid deposited by the treatment liquid droplet ejection device.

According to this aspect of the present invention, it is possible to optimize the deposition volume of the repellent agent in accordance with the treatment liquid dot data, and it is possible to reduce non-uniformity of the treatment liquid on the recording medium.

Preferably, the droplets of the treatment liquid deposited by the treatment liquid droplet ejection device form dots of the treatment liquid on the recording medium; and the repellent agent deposition control device controls the deposition volume of the repellent agent in accordance with a number of combinations of the dots of the treatment liquid to be formed of the droplets of the treatment liquid deposited onto mutually adjacent pixels per unit surface area in dot data for the droplets of the treatment liquid deposited by the treatment liquid droplet ejection device.

According to this aspect of the present invention, it is possible to simplify the control of the deposition volume of repellent agent.

In order to attain the aforementioned object, the present invention is directed to an image forming method of forming an image on a surface of a recording medium by using ink and treatment liquid, the ink containing coloring material, the treatment liquid containing at least one of a component which aggregates the coloring material and a component which increases viscosity of the ink, the method comprising the steps of: depositing a repellent agent onto the recording medium to render the surface of the recording medium liquid-repellent; ejecting and depositing droplets of the treatment liquid onto the recording medium on which the repellent agent has been deposited; and ejecting and depositing droplets of the ink onto the recording medium on which the droplets of the treatment liquid have been deposited.

According to this aspect of the present invention, by rendering the surface of the recording medium liquid-repellent before depositing the droplets of the treatment liquid, it is possible to suppress the wetting and spreading of the treatment liquid droplets (treatment liquid dots) that have landed on the recording medium, and therefore it is possible to prevent landing interference between the droplets of the treatment liquid. Thus, it is also possible to deposit the droplets of the treatment liquid at the same droplet ejection density as the ink droplets, rather than thinning out the treatment liquid droplets, and hence an image of high quality which does not contain image bleeding can be achieved.

Preferably, the image forming method further comprises the step of drying the treatment liquid having been deposited on the recording medium thereby rendering the treatment liquid one of solid and semi-solid before the droplets of the ink are deposited.

It is preferable that the droplets of the ink are deposited after forming a solid or semi-solid aggregating treatment agent layer (a thin film layer of dried treatment liquid). It is thereby possible to prevent image deterioration caused by movement of the coloring material and hence a high-quality image can be formed.

According to the present invention, by rendering the surface of the recording medium liquid-repellent before depositing the droplets of the treatment liquid, it is possible to suppress the wetting and spreading of the treatment liquid droplets (treatment liquid dots) that have landed on the recording medium, and therefore it is possible to prevent landing interference between the droplets of the treatment liquid. Thus, it is also possible to deposit the droplets of the treatment liquid at the same droplet deposition density as the ink droplets, rather than thinning out the treatment liquid droplets, and hence an image of high quality which does not contain image bleeding can be achieved.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is a flowchart diagram showing a control method corresponding to the type of recording medium, as an embodiment of a method of controlling the deposition of repellent agent;

FIGS. 5A to 5C are diagrams showing the relationship between the diameter D2 of the treatment liquid dots and the droplet ejection interval Pt;

FIG. 8 shows examples of a case of counting the number of combinations of treatment liquid dots;

FIG. 9 shows examples of a case of counting the number of combinations of treatment liquid dots by applying weightings for two directions;

DETAILED DESCRIPTION OF THE PREFERRED EMBODIMENTS

Figure 1:
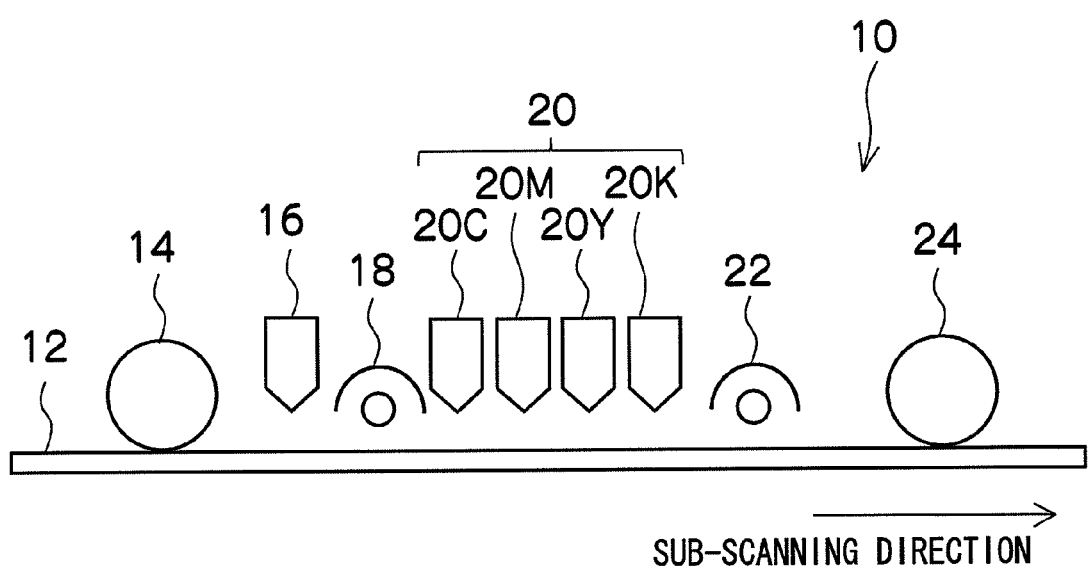
FIG. 1 is a simplified schematic drawing showing an image forming apparatus according to an embodiment of the present invention.

Firstly, the repellent agent, aggregating treatment liquid (hereinafter also referred to simply as "treatment liquid") and ink that are used in an embodiment of the present invention will described, and then the image forming apparatus according to an embodiment of the present invention will be described.

Repellent Agent

The repellent agent used in the present embodiment can be a silicone-based, fluoride-based or wax-based agent, as desired.

Specific examples of the repellent agent include, for instance: nonionic surfactants such as polyoxyethylene lauryl ether, polyoxyethylene stearyl ether, polyoxyethylene olyl ether, polyoxyethylene n-octyl phenyl ether, polyoxyethylene n-nonyl phenyl ether, polyethylene glycol dilaurate, polyethylene glycol distearate, and the like, and the following commercial products: KP341 (made by Shinetsu Chemical), Polyflow Nos. 75 and 95 (Kyoeisha Chemical), Eftop EF301, EF303 and EF352 (made by Tochem Products), Megafac F171 and F173 (made by Dainippon Ink and Chemicals), Fluorad FC430 and FC431 (made by Sumitomo 3M), Asahi Guard AG710 and Surflon S-382, SC-101, SC-102, SC-103, SC-104, SC-105 and SC-106 (made by Asahi Glass), TSW8251 (made by Tanac), and the like. These repellent agents can be used independently, or two or more types of repellent agent can be used in combination.

Treatment Liquid

The treatment liquid used in the present embodiment includes a component that makes the coloring material (pigment or dye) in the ink aggregate or raise the viscosity.

Specific examples of the treatment liquid are a treatment liquid that precipitates or insolubilizes the coloring material in the ink by reacting with the ink, and a treatment liquid that generates a semi-solid material (gel) including the coloring material in the ink, and the like.

The means of generating a reaction between the ink and the treatment liquid may be a method which causes an anionic coloring material in the ink with a cationic compound in the treatment liquid, a method which aggregates pigment in the ink by breaking down the dispersion of the pigment in the ink due to altering the pH of the ink by mixing the ink and the treatment liquid that have different pH values, a method which aggregates pigment in the ink by breaking down the dispersion of the pigment in the ink due to a reaction with a polyvalent metal salt in the treatment liquid, or the like.

It is desirable in the present embodiment to use the aggregating treatment liquid having effects of generating aggregation of the pigment and the polymer particles contained in the ink by producing a pH change in the ink when coming into contact with the ink.

Specific examples of the contents of the treatment liquid are: polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, cumaric acid, thiophene carboxylic acid, nicotinic acid, derivatives of these compounds, and salts of these.

A treatment liquid having added thereto a polyvalent metal salt or a polyallylamine is the preferred examples of the treatment liquid. The aforementioned compounds may be used individually or in combinations of two or more thereof.

From the standpoint of aggregation ability with the ink, the treatment liquid preferably has a pH of 1 to 6, more preferably a pH of 2 to 5, and even more preferably a pH of 3 to 5.

The amount of the component that causes aggregation of the pigment and polymer particles of the ink in the treatment liquid is preferably not less than 0.01 wt % and not more than 20 wt % based on the total weight of the liquid. Where the amount of this component is less than 0.01 wt %, sufficient concentration diffusion does not proceed when the treatment liquid and ink come into contact with each other, and sufficient aggregation action caused by pH variation sometimes does not occur. Further, where the amount of this component is more than 20 wt %, the ejection ability from the inkjet head can be degraded.

From the standpoint of preventing the nozzles of inkjet heads from being clogged by the dried treatment liquid, it is preferred that the treatment liquid include an organic solvent capable of dissolving water and other additives. A wetting agent and a penetrating agent are included in the organic solvent capable of dissolving water and other additives.

The solvents can be used individually or in a mixture of plurality thereof together with water and other additives.

The content ratio of the organic solvent capable of dissolving water and other additives is preferably not more than 60 wt % based on the total weight of the treatment liquid. Where this amount is higher than 60 wt %, the viscosity of the treatment liquid increases and ejection ability from the inkjet head can be degraded.

In order to improve fixing ability and abrasive resistance, the treatment liquid may further include a resin component. Any resin component may be employed, provided that the ejection ability from a head is not degraded when the treatment liquid is ejected by an inkjet system and also provided that the treatment liquid will have high stability in storage. Thus, water-soluble resins and resin emulsions can be freely used.

An acrylic resin, a urethane resin, a polyester, a vinyl resin, and a styrene resin can be considered as the resin components. In order to demonstrate a sufficient function of improving the fixing ability, a polymer with a comparatively high molecular weight has to be added at a high concentration of 1 wt % to 20 wt %. However, where such a material is added to and dissolved in a liquid, the viscosity thereof increases and ejection ability is degraded. A latex can be effectively added as an adequate material that can be added to a high concentration, while inhibiting the increase in viscosity. Examples of latex materials include alkyl acrylate copolymers, carboxy-modified SBR (styrene-butadiene latex), SIR (styrene-isoprene) latex, MBR (methyl methacrylate-butadiene latex), and NBR (acrylonitrile-butadiene latex). From the standpoint of the process, in order to improve both the stability during storage at normal temperature and the transferability after heating, while ensuring a strong effect during fixing, it is preferred that the glass transition temperature Tg of the latex be not lower than 50° C. and not higher than 120° C. Furthermore, from the standpoint of the process, in order to obtain sufficient fixing at a low temperature, while ensuring a strong effect during fixing, it is preferred that the minimum film-formation temperature MFT be not higher than 100° C., more preferably not higher than 50° C.

The aggregation ability may be further improved by introducing polymer microparticles of reverse polarity with respect to that of the ink into the treatment liquid and causing the aggregation of the pigment contained in the ink with the polymer microparticles.

The aggregation ability may be also improved by introducing a curing agent corresponding to the polymer micropaiticle component contained in the ink into the treatment liquid, bringing the two liquids into contact, causing aggregation and also crosslinking or polymerization of the resin emulsion in the ink component.

The treatment liquid used in the present embodiment can include a surfactant.

Examples of suitable surfactants of a hydrocarbon system include anionic surfactants such as fatty acid salts, alkylsulfuric acid esters and salts, alkylbenzenesulfonic acid salts, alkylnaphthalenesulfonic acid salts, dialkylsulfosuccinic acid salts, alkylphosphoric acid esters and salts, naphthalene-sulfonic acid formalin condensate, and polyoxyethylene alkylsulfuric acid esters and salts, and nonionic surfactants such as polyoxyethyelene alkyl ethers, polyoxyethylene alkylallyl ethers, polyoxyethylene fatty acid esters, sorbitan fatty acid esters, polyoxyethylene sorbitan fatty acid esters, polyoxyethylene alkylamines, glycerin fatty acid esters, and oxyethylene oxypropylene block copolymer. It is preferred that SURFYNOLS (made by Air Products & Chemicals), which is an acetylene-type polyoxyethylene oxide surfactant, be used. Amineoxide-type amphoteric surfactants such as N,N-dimethyl-N-alkylamineoxide is also a preferred surfactant.

A surfactant described in Japanese Patent Application Publication No. 59-157636, pages 37 to 38 and Research Disclosure No. 308119 (1989) can be also used. Fluorine-containing (fluorinated alkyl system) and silicone-type surfactants such as described in Japanese Patent Application Publication Nos. 2003-322926, 2004-325707, and 2004-309806 can be also used. These surface tension adjusting agents can be also used as an antifoaming agent. Chelating agents represented by fluorine-containing or silicone-type compounds and EDTA can be also used.

These agents are effective in reducing surface tension and increasing wettability on the image formation body (recording medium, intermediate transfer body, etc.). Further, even when the ink is the first to be deposited, effective aggregation action proceeds because of increased wettability of the ink and enlarged contact surface area of the two liquids.

The surface tension of the treatment liquid in accordance with the present invention is preferably 10 mN/m to 50 mN/m. From the standpoint of improving the wettability on the intermediate transfer body and also size reduction ability and ejection ability of droplets, it is even more preferred that the surface tension be 15 mN/m to 45 mN/m.

The viscosity of the treatment liquid in accordance with the present invention is preferably 1.0 mPa.s to 20.0 mPa.s.

If necessary, a pH buffer agent, an antioxidant, an anti-mold agent, a viscosity adjusting agent, an electrically conductive agent, an ultraviolet agent, and (ultraviolet) absorbent, etc. can be also added.

Ink

The ink used in the present embodiment is water-based pigment ink that contains the following materials insoluble to the solvent (water): pigment particles as the coloring material, and polymer particles.

It is desirable that the concentration of the solvent-insoluble materials in the ink is not less than 1 wt % and not more than 20 wt %, taking account of the fact that the viscosity of the ink suitable for ejection is 20 mPa.s or lower. It is more desirable that the concentration of the pigment in the ink is not less than 4 wt %, in order to obtain good optical density in the image. It is desirable that the surface tension of the ink is not less than 20 mN/m and not more than 40 mN/m, taking account of ejection stability.

The coloring material in the ink may be pigment or a combination of pigment and dye. From the viewpoint of the aggregating characteristics when the ink comes into contact with the treatment liquid, a dispersed pigment in the ink is desirable for more effective aggregation. Desirable pigments include: a pigment dispersed by a dispersant, a self-dispersing pigment, a pigment in which the pigment particle is coated with a resin (hereinafter referred to as "microcapsule pigment"), and a polymer grafted pigment. Moreover, from the viewpoint of the aggregating characteristics of the coloring material, it is more desirable that the coloring material is modified with a carboxyl group having a low degree of disassociation.

There are no particular restrictions on the resin used for a microcapsule pigment, but desirably, it should be a compound of high molecular weight which has a self-dispersing capability or solubility in water, and contains an anionic group (acidic). Generally, it is desirable that the resin should have a number average molecular weight in the approximate range of 1,000 to 100,000, and especially desirably, in the approximate range of 3,000 to 50,000. Moreover, desirably, this resin can dissolved in an organic solvent to form a solution. By limiting the number average molecular weight of the resin to this range, it is possible to make the resin display satisfactory functions as a covering film for the pigment particle, or as a coating film in the ink composition.

The resin may itself have a self-dispersing capability or solubility, or these functions may be added or introduced. For example, it is possible to use a resin having an introduced carboxyl group, sulfonic acid group, or phosphonic acid group or another anionic group, by neutralizing with an organic amine or alkali metal. Moreover, it is also possible to use a resin into which one or two or more anionic groups of the same type or different types have been introduced. In the embodiment of the present invention, it is desirable to use a resin which has been neutralized by means of a salt and which contains an introduced carboxyl group.

There are no particular restrictions on the pigment used in the present embodiment, and specific examples of orange and yellow pigments are: C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180, and C.I. Pigment Yellow 185.

Specific examples of red and magenta pigments are: C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, and C.I. Pigment Red 222.

Specific examples of green and cyan pigments are: C. I. Pigment Blue 15, C. I. Pigment Blue 15:2, C. I. Pigment Blue 15:3, C. I. Pigment Blue 16, C. I. Pigment Blue 60, and C. I. Pigment Green 7.

Specific examples of a black pigment are: C. I. Pigment Black 1, C. I. Pigment Black 6, and C. I. Pigment Black 7.

It is desirable in the present embodiment that the ink contains polymer particles that do not contain any colorant, as a component for reacting with the treatment liquid. The polymer particles can improve the image quality by strengthening the ink viscosity raising action and the aggregating action through reaction with the treatment liquid. In particular, a highly stable ink can be obtained by adding anionic polymer particles to the ink.

By using the ink containing the polymer particles that produce the viscosity raising action and the aggregating action through reaction with the treatment liquid, it is possible to increase the quality of the image, and at the same time, depending on the type of polymer particles, the polymer particles may form a film on the recording medium, and therefore beneficial effects can be obtained in improving the wear resistance and the waterproofing characteristics of the image.

The method of dispersing the polymer particles in the ink is not limited to adding an emulsion of the polymer particles to the ink, and the resin may also be dissolved, or included in the form of a colloidal dispersion, in the ink.

The polymer particles may be dispersed by using an emulsifier, or the polymer particles may be dispersed without using any emulsifier. For the emulsifier, a surfactant of low molecular weight is generally used, and it is also possible to use a surfactant of high molecular weight. It is also desirable to use a capsule type of polymer particles having an outer shell composed of acrylic acid, methacrylic acid, or the like (core-shell type of polymer particles in which the composition is different between the core portion and the outer shell portion).

The polymer particles dispersed without any surfactant of low molecular weight are known as the soap-free latex, which includes polymer particles with no emulsifier or a surfactant of high molecular weight. For example, the soap-free latex includes polymer particles that use, as an emulsifier, the above-described polymer having a water-soluble group, such as a sulfonic acid group or carboxylic acid group (a polymer with a grafted water-soluble group, or a block polymer obtained from a monomer having a water-soluble group and a monomer having an insoluble part).

It is especially desirable in the present embodiment to use the soap-free latex compared to other type of resin particles obtained by polymerization using an emulsifier, since there is no possibility that the emulsifier inhibits the aggregating reaction and film formation of the polymer particles, or that the free emulsifier moves to the surface after film formation of the polymer particles and thereby degrades the adhesive properties between the recording medium and the ink aggregate in which the coloring material and the polymer particles are combined.

Examples of the resin component added as the resin particles to the ink include: an acrylic resin, a vinyl acetate resin, a styrene-butadiene resin, a vinyl chloride resin, an acryl-styrene resin, a butadiene resin, and a styrene resin.

In order to make the polymer particles have high speed aggregation characteristics, it is desirable that the polymer particles contain a carboxylic acid group having a low degree of disassociation. Since the carboxylic acid group is readily affected by change of pH, then the polymer particles containing the carboxylic acid group easily change the state of the dispersion and have high aggregation characteristics.

The change in the dispersion state of the polymer particles caused by change in the pH can be adjusted by means of the component ratio of the polymer particle having a carboxylic acid group, such as ester acrylate, or the like, and it can also be adjusted by means of an anionic surfactant which is used as a dispersant.

Desirably, the resin constituting the polymer particles is a polymer that has both of a hydrophilic part and a hydrophobic part. By incorporating a hydrophobic part, the hydrophobic part is oriented toward to the inner side of the polymer particle, and the hydrophilic part is oriented efficiently toward the outer side, thereby having the effect of further increasing the change in the dispersion state caused by change in the pH of the liquid. Therefore, aggregation can be performed more efficiently.

Examples of commercially available resin emulsion include: Joncryl 537 and 7640 (styrene-acrylic resin emulsion, manufactured by Johnson Polymer), Microgel E-1002 and E-5002 (styrene-acrylic resin emulsion, manufactured by Nippon Paint), Voncoat 4001 (acrylic resin emulsion, manufactured by Dainippon Ink and Chemicals), Voncoat 5454 (styrene-acrylic resin emulsion, manufactured by Dainippon Ink and Chemicals), SAE-1014 (styrene-acrylic resin emulsion, manufactured by Zeon Japan), Jurymer ET-410 (acrylic resin emulsion, manufactured by Nihon Junyaku), Aron HD-5 and A-104 (acrylic resin emulsion, manufactured by Toa Gosei), Saibinol SK-200 (acrylic resin emulsion, manufactured by Saiden Chemical Industry), and Zaikthene L (acrylic resin emulsion, manufactured by Sumitomo Seika Chemicals). However, the resin emulsion is not limited to these examples.

The weight ratio of the polymer particles to the pigment is desirably 2:1 through 1:10, and more desirably 1:1 through 1:3. If the weight ratio of the polymer particles to the pigment is less than 2:1, then there is no substantial improvement in the aggregating force of the aggregate formed by the cohesion of the polymer particles. On the other hand, if the weight ratio of the polymer particles to the pigment is greater than 1:10, the viscosity of the ink becomes too high and the ejection characteristics, and the like, deteriorate.

From the viewpoint of the adhesive force after the cohesion, it is desirable that the molecular weight of the polymer particles added to the ink is no less than 5,000. If it is less than 5,000, then beneficial effects are insufficient in terms of improving the internal aggregating force of the ink aggregate, achieving good fixing characteristics after transfer to the recording medium, and improving the image quality.

Desirably, the volume-average particle size of the polymer particles is in the range of 10 nm to 1 μm, more desirably, the range of 10 nm to 500 nm, even desirably 20 nm to 200 nm and particularly desirably, the range of 50 nm to 200 nm. If the particle size is equal to or less than 10 nm, then significant effects in improving the image quality or enhancing transfer characteristics cannot be expected, even if aggregation occurs. If the particle size is equal to or greater than 1 μm, then there is a possibility that the ejection characteristics from the ink head or the storage stability will deteriorate. Furthermore, there are no particular restrictions on the volume-average particle size distribution of the polymer particles and they may have a broad volume-average particle size distribution or they may have a monodisperse volume-average particle size distribution.

Moreover, two or more types of polymer particles may be used in combination in the ink.

Examples of the pH adjuster added to the ink in the present embodiment include an organic base and an inorganic alkali base, as a neutralizing agent. In order to improve storage stability of the ink for inkjet recording, the pH adjuster is desirably added in such a manner that the ink for inkjet recording has the pH of 6 through 10.

It is desirable in the present embodiment that the ink contains a water-soluble organic solvent, from the viewpoint of preventing nozzle blockages in the ejection head due to drying. Examples of the water-soluble organic solvent include a wetting agent and a penetrating agent.

Examples of the water-soluble organic solvent in the ink are: polyhydric alcohols, polyhydric alcohol derivatives, nitrous solvents, monohydric alcohols, and sulfurous solvents. Specific examples of the polyhydric alcohols are: ethylene glycol, diethylene glycol, propylene glycol, butylene glycol, triethylene glycol, 1,5-pentane diol, 1,2,6-hexane triol, and glycerin. Specific examples of the derivatives of polyhydric alcohol are: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin. Specific examples of the nitrous solvents are: pyrrolidone, N-methyl-2-pyrrolidone, cyclohexyl pyrrolidone, and triethanol amine. Specific examples of the monohydric alcohols are: ethanol, isopropyl alcohol, butyl alcohol, benzyl alcohol, and the like. Specific examples of the sulfurous solvents are: thio diethalnol, thio diglycerol, sulfolane, and dimethyl sulfoxide. Apart from these, it is also possible to use propylene carbonate, ethylene carbonate, or the like.

The ink according to the present embodiment may contain a surfactant.

Examples of the surfactant in the ink include: in a hydrocarbon system, an anionic surfactant, such as a salt of a fatty acid, an alkyl sulfate ester salt, an alkyl benzene sulfonate salt, an alkyl naphthalene sulfonate salt, a dialkyl sulfosuccinate salt, an alkyl phosphate ester salt, a naphillalene sulfonate/formalin condensate, and a polyoxyethylene alkyl sulfonate ester salt; and a non-ionic surfactant, such as a polyoxyethylene alkyl ether, a polyoxyethylene alkyl aryl ether, a polyoxyethylene fatty acid ester, a sorbitan fatty acid ester, a polyoxyethylene sorbitan fatty acid ester, a polyoxyethylene alkyl amine, a glycerin fatty acid ester, and an oxyethylene oxypropylene block copolymer. Desirable examples of the surfactant further include: Surfynols (manufactured by Air Products & Chemicals), which is an acetylene-based polyoxyethylene oxide surfactant, and an amine oxide type of amphoteric surfactant, such as N,N-dimethyl-N-alkyl amine oxide.

Moreover, it is also possible to use the surfactants cited in Japanese Patent Application Publication No. 59-157636, pages 37 to 38, and Research Disclosure No. 308119 (1989). Furthermore, it is also possible to use a fluoride type (alkyl fluoride type), or silicone type of surfactant such as those described in Japanese Patent Application Publication Nos. 2003-322926, 2004-325707 and 2004-309806. It is also possible to use a surface tension adjuster of this kind as an anti-foaming agent; and a fluoride or silicone compound, or a chelating agent, such as ethylenediamine tetraacetic acid (EDTA), can also be used.

The surfactant contained in the ink has beneficial effects in raising the wettability on the solid or semi-solid aggregating treatment agent layer by reducing the surface tension, and therefore the aggregating action effectively progresses due to the increase in the contact surface area between the solid or semi-solid aggregating treatment agent layer and the ink.

It is desirable in the present embodiment that the ink has the surface tension of 10 mN/m through 50 mN/m; and from the viewpoint of achieving good permeability into the permeable recording medium, formation of fine droplets and good ejection properties, the surface tension of the ink is more desirably 15 mN/m through 45 rnN/m.

It is desirable in the present embodiment that the ink has the viscosity of 1.0 mPa.s through 20.0 mPa.s.

Apart from the foregoing, according to requirements, it is also possible that the ink contains a pH buffering agent, an anti-oxidation agent, an antibacterial agent, a viscosity adjusting agent, a conductive agent, an ultraviolet absorbing agent, or the like.

Image Forming Method

The image forming method according to an embodiment of the present invention will be described with reference to FIG. 1.

An image forming apparatus 10 shown in FIG. 1 includes, in order from the upstream side in the direction of conveyance of a recording medium 12 (the sub-scanning direction), a repellent agent deposition unit 14, a treatment liquid droplet ejection unit 16, a treatment liquid drying unit 18, an ink droplet ejection unit 20, an ink drying unit 22 and a fixing unit 24.

The repellent agent deposition unit 14 renders the surface of the recording medium 12 liquid-repellent by depositing a solution containing a liquid-repellent agent (hereinafter referred to simply as "repellent agent") onto the recording medium 12. In the present embodiment, there are no particular restrictions on the method of depositing the repellent agent, and for example, it is possible to employ an application method using an application roller, or the like, or a spraying method, an inkjet recording method, or other methods of various types. In the present embodiment, the repellent agent is applied to the recording medium 12 by means of an application roller. The method of controlling the deposition of the repellent agent is described hereinafter.

The treatment liquid droplet ejection unit 16 includes a recording head based on an inkjet method (hereinafter referred to as a "treatment liquid ejection head"), which ejects droplets of the treatment liquid from the nozzles of the treatment liquid ejection head onto the surface of the recording medium 12 that has been rendered liquid-repellent. Desirably, the treatment liquid droplet ejection data (treatment liquid dot data) is the logical sum of the droplet ejection data (ink dot data) of the inks of respective colors (C, M, Y, K). It is thereby possible to reduce the system load required to create the droplet ejection data for the treatment liquid.

Figure 2A:
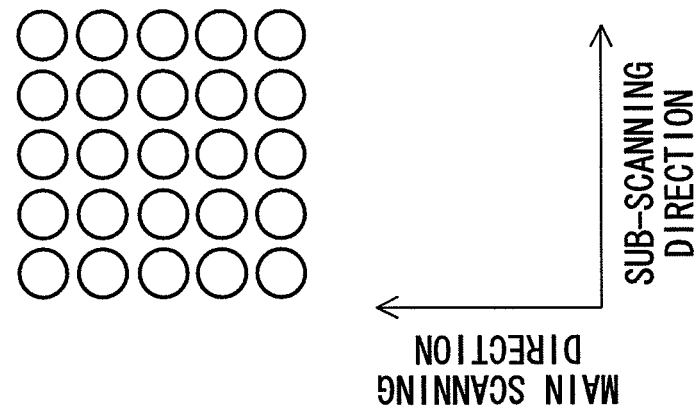
FIGS. 2A to 2C are diagrams showing arrangement patterns of treatment liquid droplets.
Figure 2B:
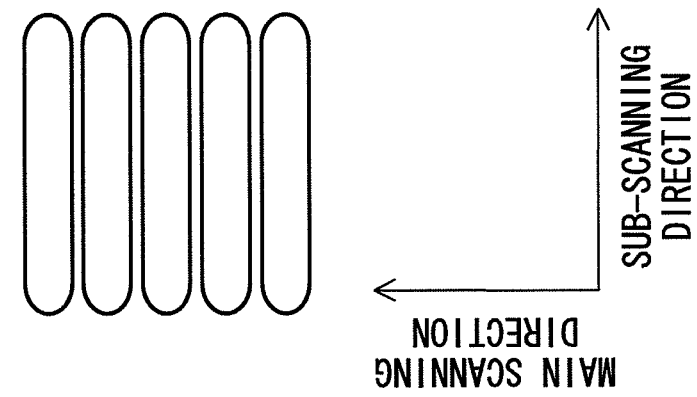
Figure 2C:
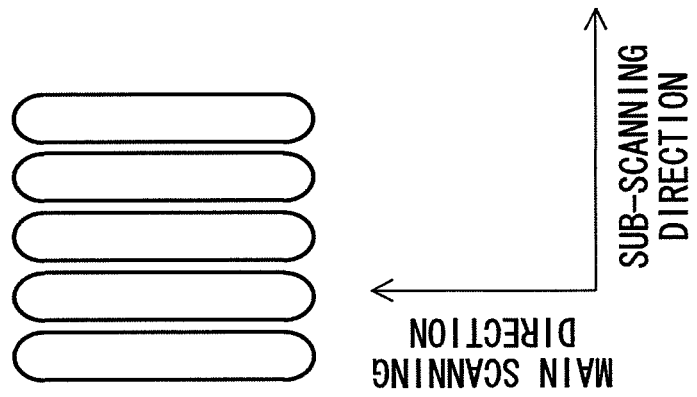

By preliminarily rendering the surface of the recording medium 12 liquid-repellent by means of the repellent agent deposition unit 14 disposed to the upstream side in the sub-scanning direction, it is possible to suppress the spreading of the treatment liquid droplets (treatment liquid dots) that have been deposited on the recording medium 12. It is thereby possible to achieve the arrangement patterns for the treatment liquid droplets shown in FIGS. 2A to 2C. FIG. 2A shows a case where the treatment liquid droplets that are mutually adjacent on the recording medium 12 do not combine with each other. FIG. 2B, on the other hand, shows a case where the treatment liquid droplets that are mutually adjacent in the sub-scanning direction on the recording medium 12 combine with each other, but the treatment liquid droplets that are mutually adjacent in the main scanning direction do not combine together but rather form a line shape following the sub-scanning direction. For example, if using a matrix type head (see FIGS. 11A to 11C) in which a plurality of nozzles are arranged in a two-dimensional configuration (matrix configuration), then the treatment liquid dots that are mutually adjacent in the sub-scanning direction on the recording medium 12 are formed by droplets that are ejected by the same nozzle, and therefore the landing time differential is short in comparison with the treatment liquid droplets that are mutually adjacent in the main scanning direction. Consequently as shown in FIG. 2B, only the treatment liquid droplets that are mutually adjacent in the sub-scanning direction on the recording medium 12 are liable to combine with each other. Furthermore, FIG. 2C corresponds to a pattern in which the arrangement pattern of the treatment liquid droplets shown in FIG. 2B has been rotated through 90 degrees, and in this case, the treatment liquid droplets that are mutually adjacent in the main scanning direction combine with each other on the recording medium 12, but the treatment liquid droplets that are mutually adjacent in the sub-scanning direction do not combine together but rather form a line shape following the main scanning direction. For example, if using a recording head in which a plurality of nozzles are arranged in one row in the main scanning direction, the landing time differential between the treatment liquid droplets that are mutually adjacent in the main scanning direction is the shortest (ideally, these droplets land simultaneously), and therefore as shown in FIG. 2C, only the treatment liquid droplets that are mutually adjacent in the main scanning direction on the recording medium 12 are liable to combine with each other. In any of the cases shown in FIGS. 2A, 2B and 2C, a state is assumed in which the treatment liquid is deposited onto at least a portion of the positions where the ink droplets are to be deposited on the recording medium 12 (the positions where ink dots are to be formed), and therefore it is possible for each of the ink droplets to react with the treatment liquid. Furthermore, in the case of FIG. 2A, the non-uniformity of the treatment liquid droplets is eliminated due to the fact that none of the treatment liquid droplets combine with each other, but in the cases in FIG. 2B or 2C, the treatment liquid droplets combine only in one dimension and hence there is virtually no substantial non-uniformity, and all of the ink droplets can be reacted with the treatment liquid.

Here, the physical properties for achieving the droplet deposition arrangement of the treatment liquid described above will be described.

In order to achieve the arrangement pattern of the treatment liquid droplets shown in FIG. 2A, it is necessary to satisfy the following Relationship (1):

$$2\left[V \times \left(\frac{3(1+\cos\theta)\sin\theta}{\pi(1-\cos\theta)(2+\cos\theta)}\right)\right]^{\frac{1}{3}} < Pt, \quad (1)$$

where V ($\mu m^3$) is the ejection volume of the treatment liquid droplet, Pt ($\mu m$) is the deposition interval (dot pitch) of the treatment liquid droplets, and θ (degrees) is the contact angle of the treatment liquid droplet on the recording medium 12 that has been rendered liquid-repellent.

If the ejection volume V of the treatment liquid droplet is 2000 $\mu m^3$ (=2 pl) and the droplet ejection interval of the treatment liquid droplets Pt is 21.2 $\mu m$ (equivalent to 1200 dpi), then the Relationship (1) is satisfied when the contact angle θ of the treatment liquid droplets is approximately 81 (degrees) or greater.

On the other hand, in order to achieve the treatment liquid droplet arrangement pattern shown in FIG. 2B or 2C, although there is no analytical expression for the ejection volume V, the droplet ejection interval Pt and the contact angle θ of the treatment liquid droplets, if the ejection volume V of the treatment liquid droplet is 2000 $\mu m^3$ (=2 pl) and the droplet ejection interval of the treatment liquid droplets Pt is 21.2 $\mu m$ (equivalent to 1200 dpi), then the contact angle θ of the treatment liquid should be set to approximately 70 degrees or greater.

The treatment liquid drying unit 18 is adjacently arranged on the downstream side of the treatment liquid droplet ejection unit 16 in terms of the sub-scanning direction. The treatment liquid drying unit 18 is provided with a hot air drying device having a built-in heater, and dries the treatment liquid that has been deposited on the recording medium 12 so that a solid or semi-solid aggregating treatment agent layer (a thin film layer of dried treatment liquid) is formed on the surface of the recording medium 12.

The "solid or semi-solid aggregating treatment agent layer" includes a layer having a solvent content rate of 0% to 70%, where the solvent content rate is defined as: "Solvent content rate"="Weight of solvent contained in treatment liquid after drying, per unit surface area (g/m²)"/"Weight of treatment liquid after drying, per unit surface area (g/m²)".

As a method for calculating the solvent content rate, a sheet of paper of a prescribed size (for example 100 mm×100 mm) is cut out, the total weight of the paper after the deposition of the treatment liquid (the total weight of the paper and the deposited treatment liquid before drying) and the total weight of the paper after drying of the treatment liquid (the total weight of the paper and the deposited and dried treatment liquid) are measured respectively, and the reduction in the amount of solvent due to drying (the amount of solvent evaporated) is determined from the difference between the two weights. Furthermore, the amount of solvent contained in the treatment liquid before drying can be calculated from the treatment liquid preparation method. It is possible to obtain the solvent content rate from the result of these calculations.

In the image forming apparatus 10 shown in FIG. 1, since the surface of the recording medium 12 is rendered liquid-repellent before droplets of the treatment liquid are deposited, then it is possible to prevent spreading of the treatment liquid droplets (treatment liquid dots) that have landed on the recording medium 12. Thus, even if the treatment liquid droplets are deposited at the same droplet deposition density (recording density) as the ink droplets, rather than thinning out the treatment liquid droplets, it is possible to prevent landing interference between the treatment liquid droplets (treatment liquid dots) on the recording medium 12.

Figure 15:
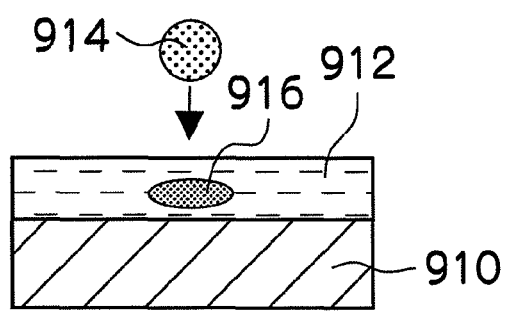
FIG. 15 is a diagram showing a state of an ink droplet landing on a liquid layer of treatment liquid in the related art.

On the other hand, if the surface of the recording medium 12 is rendered liquid-repellent, then the treatment liquid droplets that have been deposited on the recording medium 12 do not permeate immediately into the interior of the recording medium 12 and a liquid layer of the treatment liquid (treatment liquid layer) is present on the surface of the recording medium 12. If ink droplets are deposited in this state, then the ink dots (coloring material) float and move inside the treatment liquid layer, and this can give rise to deterioration in image quality (see FIG. 15). Therefore, in the present embodiment, in order to prevent image deterioration due to movement of the coloring material (floating of the dots), the treatment liquid is dried on the recording medium 12 before ink droplets are deposited onto the recording medium 12, thereby forming the solid or semi-solid aggregating treatment agent layer on the recording medium 12.

Here, Table 1 shows the evaluation results for movement of the coloring material when the solvent content rate of the treatment liquid (aggregating treatment agent layer) on the recording medium 12 is varied.

TABLE 1

| | Experiment 1 | Experiment 2 | Experiment 3 | Experiment 4 | Experiment 5 |
|---|---|---|---|---|---|
| Drying step | No | Yes | Yes | Yes | Yes |
| Total weight (g/m²) | 10.0 | 6.0 | 4.0 | 3.0 | 1.3 |
| Weight of water (g/m²) | 8.7 | 4.7 | 2.7 | 1.5 | 0 |
| Solvent content rate (%) | 87 | 78 | 67 | 50 | 0 |
| Movement of coloring material | Poor (defective) | Fair (slight movement) | Good (inconspicuous movement) | Excellent | Excellent |

As shown in Table 1, when the treatment liquid was not dried (Experiment 1), then image deterioration occurred due to movement of the coloring material.

On the other hand, when drying of the treatment liquid was carried out (Experiments 2 to 5), then the movement of the coloring material was inconspicuous when the treatment liquid was dried until the solvent content rate in the treatment liquid of 70% or lower, and the movement of the coloring material assumed a satisfactory level that was imperceptible by visual inspection when the treatment liquid was dried until the solvent content rate of 50% or lower. Thus, it was confirmed that that drying of the treatment liquid is effective in preventing image deterioration.

Figure 3:
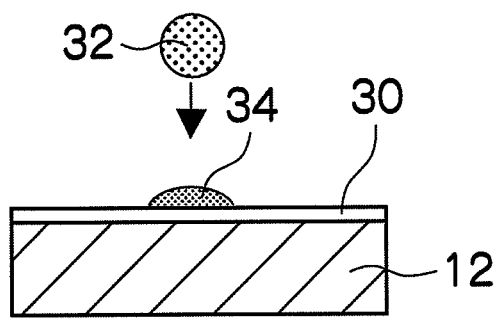
FIG. 3 is a diagram showing a state of an ink droplet landing on a solid or semi-solid aggregating treatment agent layer.

The ink droplet ejection unit 20 is provided with inkjet type recording heads (hereinafter referred to as "ink ejection heads") 20C, 20M, 20Y and 20K, which correspond to the respective colored inks of cyan (C), magenta (M), yellow (Y) and black (K), and eject droplets of the corresponding colored inks from the nozzles of the ink ejection heads 20C, 20M, 20Y and 20K in accordance with the input image data. In this case, as shown in FIG. 3, the solid or semi-solid aggregating treatment agent layer 30 is formed on the surface of the recording medium 12, and therefore when the ink droplets 32 that have been ejected from the ink ejection heads 20C, 20M, 20Y and 20K land on the surface of the solid or semi-solid aggregating treatment agent layer 30, the coloring material in the ink (ink dot) 34 aggregates instantaneously and image deterioration due to movement of the coloring material (floating of the dots) can be prevented.

The ink drying unit 22 is provided with a hot air drying device having a built-in heater, similarly to the treatment liquid drying unit 18, and dries the ink deposited as droplets on the recording medium 12. In the present embodiment, a hot air drying method is employed in which a hot air flow that has been heated to a prescribed temperature is blown from the front surface side of the recording medium 12 (the upper side in FIG. 1). Moreover, it is also possible to dispose an infrared heater, or the like, above the recording medium 12 and apply heat by radiation. Further, a desirable mode is one in which the vapor concentration above the recording medium 12 is lowered by heating the treatment liquid on the recording medium 12 by means of a heating device (for example, a heater) from the rear surface side of the recording medium 12 (the lower side in FIG. 1) and supplying a drying air by means of an air blowing device (for example, a ventilation fan) from the front surface side of the recording medium 12. Furthermore, instead of or in combination with the device that dries the ink, it is also possible to remove the solvent component (liquid component) in the ink by placing a porous roller, or the like, in contact with the surface of the recording medium 12.

The fixing unit 24 fixes the image formed on the recording medium 12, by applying heat and pressure to the surface (image forming surface) of the recording medium 12 by bringing a roller member (heating roller) into contact with the surface of the recording medium 12. In the fixing unit 24, the resin (latex) contained in the ink is melted and hence the adhesiveness between the ink and the repellent agent, and between the repellent agent and the recording medium 12, is ensured. Desirably, it is possible to melt the resin during the fixing step by previously setting the temperature for fixing to a higher temperature than the glass transition temperature of the resin. Moreover, it is also possible to provide a plurality of fixing rollers.

Evaluation Experiments

Next, evaluation experiments that were carried out by the inventor in order to confirm the beneficial effects of the present invention will be described.

The repellent agent, the treatment liquid and the ink used in the evaluation experiments were as described below.

Preparation of the Repellent Agent

Repellent agents 1 and 2 were respectively prepared by mixing together the following materials.

| <Repellent agent 1> | |
|---|---|
| Fluoride-based surfactant (Asahi Guard AG710) | 5 parts by weight |
| Water | remainder |

| <Repellent agent 2> | |
|---|---|
| Silicone-based surfactant (TSW8251) | 5 parts by weight |
| Water | remainder |

Preparation of the Treatment Liquid

A treatment liquid was prepared by mixing together the following materials:

| | |
|---|---|
| Glycerin | 15 parts by weight; |
| Malonic acid | 10 parts by weight; |
| Surfactant 1 | 1 part by weight; and |
| Deionized water | 74 parts by weight. |

The surfactant 1 described above is represented as:

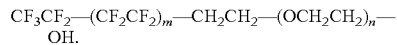

$CF_3CF_2$—$(CF_2CF_2)_m$—$CH_2CH_2$—$(OCH_2CH_2)_n$—OH.

The pH of the treatment liquid thus prepared was measured with a Toa DKK pH meter, WM-50EG, and the pH was found to be 3.5.

Preparation of the Ink

A dispersion liquid was prepared by combining and agitating 10 g of Cromophtal Jet Magenta DMQ (PR-122) made by Chiba Specialty Chemicals, 10.0 g of polymer for dispersion, 4.0 g of glycerin, and 26 g of deionized water. Thereupon, ultrasonic waves were irradiated for two hours in an intermittent fashion (irradiation 0.5 seconds/halt 1.0 second) in order to further disperse the pigment, using an ultrasound irradiation apparatus (SONICS Vibra-cell VC-750, tapered micro chip: diameter of 5 mm, amplitude: 30%), and a 20 wt % pigment dispersion liquid was obtained.

Separately from this, the following compounds were measured and mixed together to prepare a mixed liquid I:

| | |
|---|---|
| Glycerin | 5.0 g; |
| Olefin E1010 (made by Nisshin Kagaku Kogyo) | 1.0 g; and |
| Deionized water | 11.0 g. |

This mixed liquid I was titrated slowly into 23.0 g of an agitated 44% SBR dispersion liquid (polymer particles: acrylic acid 3 wt %, Tg 30° C.) and agitated to prepare a mixed liquid II. Furthermore, this mixed liquid II was titrated slowly into the aforementioned 20% pigment dispersion liquid and agitated and mixed, to prepare 100 g of magenta ink.

Evaluation Method

In the present evaluation experiments, various evaluations were made after carrying out prescribed pre-treatment on the recording medium. Urite (matt coated paper) was used as the recording medium.

In the examples of the present invention, the repellent agent was applied to the recording medium with a No. 3 coating rod, whereupon treatment liquid droplets were deposited in a solid pattern onto the whole surface of the recording medium, at a recording density of 1200 dpi in both the main scanning direction and the sub-scanning direction, using an inkjet head based on a single pass system as the treatment liquid ejection head. Moreover, evaluations were made for cases where the treatment liquid was dried by blowing a hot air from a dryer on a hot plate at 40° C. (Examples 2 and 4), and cases where drying of the treatment liquid was not carried out (Examples 1 and 3).

Furthermore, as a comparative example, evaluations were made in a case where treatment liquid droplets were deposited under the same conditions as the examples of the present invention, without first applying a repellent agent, and furthermore, drying of the treatment liquid was not carried out.

The details of the respective assessment items were as stated below.

<Line Bleeding (Aggregating Properties)>

Using an inkjet head (ink ejection head) of a single pass type, ink droplets were deposited at the same recording density as the treatment liquid ejection head (i.e., 1200 dpi) onto the recording medium on which the prescribed pre-treatment had been carried out, thereby forming lines (each line being composed of a plurality of ink dots) in the main scanning direction and the sub-scanning direction. The cases where non-uniformity of the line width, breaking of the lines or liquid pooling was observed were marked as "poor", and the other cases were marked as "good".

<Movement of Coloring Material (Floating of Dots)>

When a lattice pattern of inks droplets at an interval of 150 dpi was deposited using the above-described ink ejection head onto a recording medium on which the prescribed pre-treatment had been carried out. The cases where the interval between dots diverged by 5% or more on average (i.e., 8.5 μm or greater) were marked as "poor", the cases where the divergence was not less than 3% and less than 5% (i.e., not less than 5.1 μm and less than 8.5 μm) were marked as "fair", and the other cases were marked as "good".

<Solid Image Forming Properties>

Using the above-described ink ejection head, a solid pattern of ink droplets was deposited at the same recording density as the treatment liquid head (i.e., 1200 dpi) onto the recording medium on which the prescribed pre-treatment had been carried out. Thereupon, the printed image was captured through a microscope, converted to a binary image, and microscopic white spots in the image were analyzed. As a result of this analysis, the cases where the rate of white spots between dots was 80% or above were marked as "poor", the cases where the rate was not less than 60% and less than 80% were marked as "fair", and the other cases were marked as "good".

<Uniformity of Treatment Liquid>

The surface of the recording medium on which the prescribed pre-treatment had been carried out was observed by visual inspection and the uniformity of the treatment liquid was verified. The cases where non-uniformities could be observed by visual inspection were marked as "poor", and the cases where the treatment liquid was substantially uniform were marked as "good".

<State of Treatment Liquid Dots>

The surface of the recording medium on which the prescribed pre-treatment had been carried out was observed through a microscope and the landing interference of the treatment liquid droplets (treatment liquid dots) was verified.

In either of these cases, the liquid droplet volume of the ink and the treatment liquid (ejection volume) was 2.5 pl. Furthermore, the time from the completion of the pre-treatment until the ejection of ink droplets was approximately one second.

Experimental Results

Table 2 shows the results of the evaluation experiments.

TABLE 2

| | Repellent agent | Drying of treatment liquid | Line bleeding | Movement of coloring material (floating of dots) | Solid image forming properties | Uniformity of treatment liquid | State of treatment liquid dots |
|---|---|---|---|---|---|---|---|
| Comparative Example | None | None | Poor | Fair | Fair | Poor | Occurrence of landing interference |
| Example 1 | Repellent agent 1 (fluoride-based) | None | Good | Fair | Fair | Good | Isolated dots |
| Example 2 | Repellent agent 1 (fluoride-based) | Yes | Good | Good | Good | Good | Isolated dots |
| Example 3 | Repellent agent 2 (silicone-based) | None | Good | Fair | Fair | Good | Line in conveyance direction |
| Example 4 | Repellent agent 2 (silicone-based) | Yes | Good | Good | Good | Good | Line in conveyance direction |

As Table 2 shows, in the examples of the present invention (Examples 1 to 4), good overall results were obtained in respect of the evaluated items (line bleeding, movement of coloring material, solid image forming properties, treatment liquid uniformity, state of treatment liquid dots), in comparison with the comparative example. In particular, when drying of the treatment liquid was carried out (Examples 2 and 4), it was possible to obtain excellent results in terms of movement of the coloring material and solid image forming properties in comparison with the cases where drying of the treatment liquid was not carried out (Examples 1 and 3).

Furthermore, it was confirmed that in the cases where the fluoride-based repellent agent 1 was used (Examples 1 and 2), it was possible to prevent landing interference between the treatment liquid droplets (treatment liquid dots) that had been deposited onto the recording medium in a more effective manner in comparison with the cases where the silicone-based repellent agent 2 was used (Examples 3 and 4). However, as revealed by the results in Examples 3 and 4, there was no great difference in the printing properties between the cases where the dots were isolated (Examples 1 and 2) and the cases where the state of the treatment liquid dots was the line configuration following the conveyance direction.

Method of Controlling Deposition of Repellent Agent

Next, the method of controlling the deposition of the repellent agent will be described in relation to a control method corresponding to the types of recording media and a control method corresponding to the droplet ejection data of the treatment liquid (treatment liquid dot data).

<Control Method Corresponding to Type of Recording Medium>

FIG. 4 is a flowchart diagram showing a control method corresponding to the type of recording medium, as one method of controlling the deposition of repellent agent according to an embodiment of the present invention. Below, the control method will be described with reference to the flowchart in FIG. 4.

Firstly, the diameter (treatment liquid dot diameter) D2 of the treatment liquid droplets (treatment liquid dots) that have been deposited on the recording medium is input as the parameter of the wettability of the treatment liquid, which is determined in accordance with the type of recording medium (step S10). It is possible to determine the diameter D2 of the treatment liquid dots for each of the types of the recording media used in the image forming apparatus 10 and to store this information in a prescribed memory in the form of a data table in advance, in such a manner that the diameter D2 of the treatment liquid dots can be read out from the memory when information relating to the recording medium is acquired.

Although it is possible to directly measure the diameter D2 of the treatment liquid dots, since the treatment liquid is generally transparent, then this measurement involves difficulties in some cases. In cases such as these, it is desirable to adopt a simple method whereby the state of the deposited treatment liquid droplets on the recording medium is captured as an image from the lateral direction, and the dimension of the dots is measured from the captured image. However, it is still difficult to accurately measure the dot diameter after the treatment liquid droplets having a very small volume V of several picoliters (pl) have landed on the medium. Therefore, desirably, the dot diameter D' of a large droplet having a volume of V' of approximately a microliter (μl), which is easy to measure, is measured and the diameter D2 of the treatment liquid dot is calculated as:

$$D2 = D' \times \left(\frac{V}{V'}\right)^{\frac{1}{3}}.$$

Moreover, it is also possible to prepare a measurement liquid that is adjusted to have substantially the same viscosity and surface tension as the treatment liquid and in which a small amount of dye is dissolved, and to measure the dot diameter of this measurement liquid, the resulting value being taken as D2. With this measurement method, it is possible to accurately measure the diameter D2 of the treatment liquid dots of approximately several tens of micrometers (μm).

Next, the treatment liquid dot diameter D2 and the droplet ejection interval (dot pitch) Pt of the treatment liquid are compared (step S12).

If the relationship D2<Pt is established in the above-described comparison, then the repellent agent is not deposited (step S14). In this case, even if the surface of the recording medium is not rendered liquid-repellent, then as shown in FIG. 5A, the treatment liquid droplets (treatment liquid dots) that have landed on the recording medium do not make contact with each other, and hence there is no need to deposit the repellent agent. Conversely, if the repellent agent is deposited, then the diameter D2 of the treatment liquid dots becomes too small and the reactivity with the ink becomes poor. Furthermore, the filming force at the interface of the treatment liquid dots with respect to the recording medium becomes too small, and hence there is a problem of movement of the treatment liquid dots when the treatment liquid are dried.

On the other hand, if the relationship Pt<D2<√2×Pt is established, then a small amount of the repellent agent is deposited (step S16). In this case, if the surface of the recording medium is not rendered liquid-repellent, then as shown in FIG. 5B, the treatment liquid dots that are mutually adjacent in the longitudinal direction (main scanning direction) and the lateral direction (sub-scanning direction) on the recording medium make contact with each other; however, the treatment liquid dots that are mutually adjacent in the oblique directions do not make contact with each other. Consequently, in cases such as these, significant non-uniformity in the treatment liquid is not liable to occur and therefore a small amount of the repellent agent is deposited.

If the relationship √2×Pt<D2 is established, then a large amount of the repellent agent is deposited (step S18). If the surface of the recording medium is not rendered liquid-repellent in this case, then as shown in FIG. 5C, a state is created in which the treatment liquid dots that are mutually adjacent in the longitudinal direction and the lateral direction, as well as the oblique directions, make contact with each other and significant non-uniformity of the treatment liquid is liable to occur, and therefore a large amount of the repellent agent is deposited.

By thus controlling the deposition of the repellent agent in accordance with the types of the recording media, it is possible to reduce the non-uniformity of the treatment liquid on the recording media regardless of the wettability of the treatment liquid on the recording media (in other words, irrespectively of the types of the recording media), and consequently a satisfactory reaction between the ink and the treatment liquid is obtained and an image of high quality can be formed.

In the embodiment described with reference to FIG. 4, the diameter D2 of the treatment liquid dot is used as the parameter of the wettability of the treatment liquid that is determined in accordance with the type of recording medium; however, the parameter is not limited to this and it is also possible to use the contact angle θ of the treatment liquid droplets on the recording medium, or the spreading rate S of the treatment liquid droplets that have landed on the recording medium (the ratio between the diameter D2 of the treatment liquid droplets that have landed on the recording medium with respect to the diameter D1 achieved by spherical conversion of the treatment liquid droplets in flight; S=D2/D1), or the like.

<Control Method Corresponding to Droplet Deposition Data>

Figure 6:
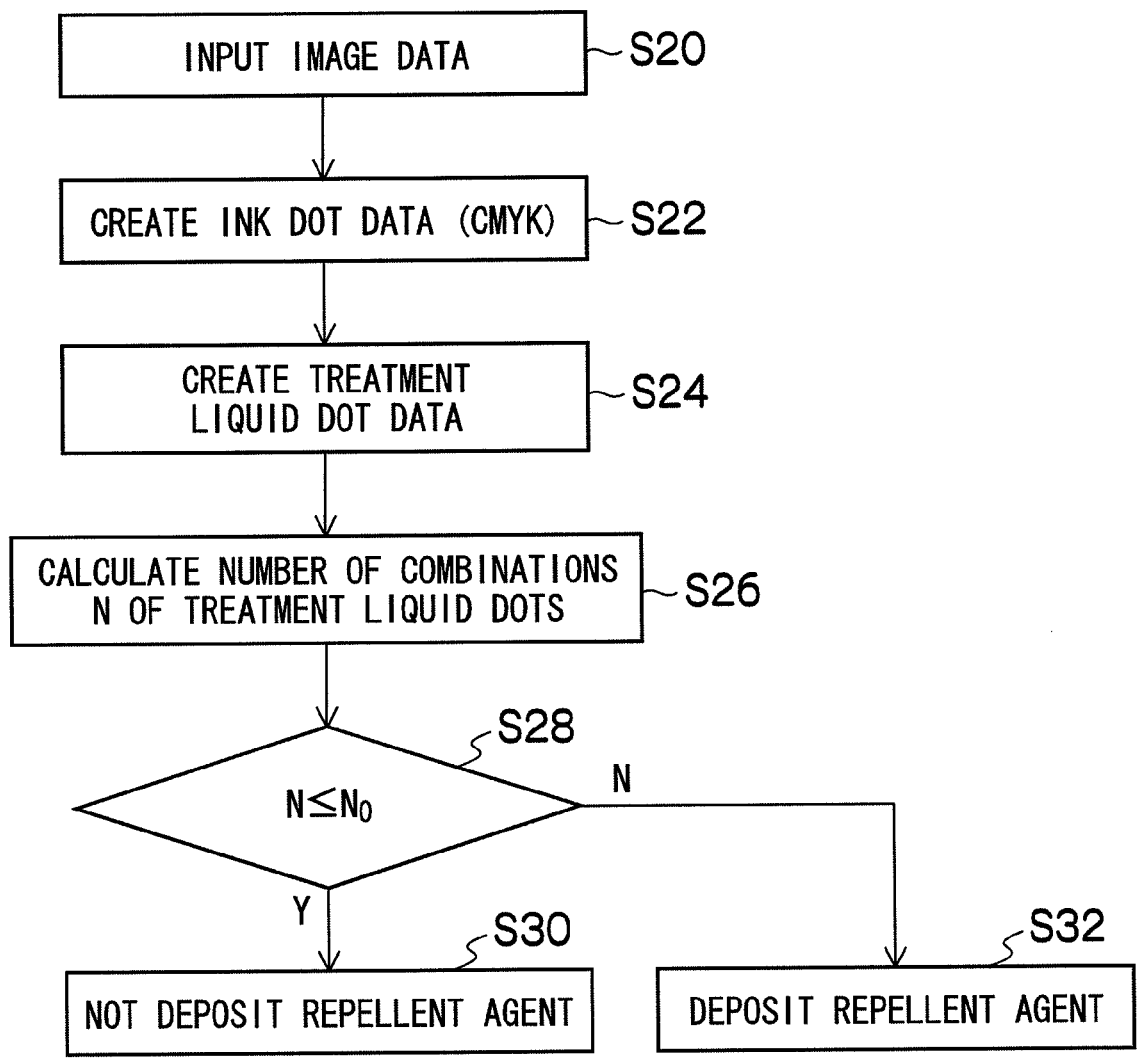
FIG. 6 is a flowchart diagram showing a control method corresponding to the treatment liquid droplet ejection data, as an embodiment of a method of controlling the deposition of repellent agent.

FIG. 6 is a flowchart diagram showing a control method corresponding to the droplet deposition data of the treatment liquid (treatment liquid dot data), as one method of controlling the deposition of repellent agent according to an embodiment of the present invention. Below, the control method will be described with reference to the flowchart in FIG. 6.

Firstly, image data is input (step S20).

Next, ink droplet deposition data (ink dot data) of respective colors (CMYK) are created on the basis of the input image data (step S22). For example, the input image data are converted into the ink dot data of the respective colors, using a commonly known image processing device employing an error diffusion method, or the like.

Thereupon, the treatment liquid droplet deposition data (treatment liquid dot data) are created from the ink dot data of the respective colors (step S24). In this case, desirably, the logical sum of the ink dot data of the respective colors is taken as the treatment liquid dot data, since this makes it possible to reduce the load on the system.

Figure 7:
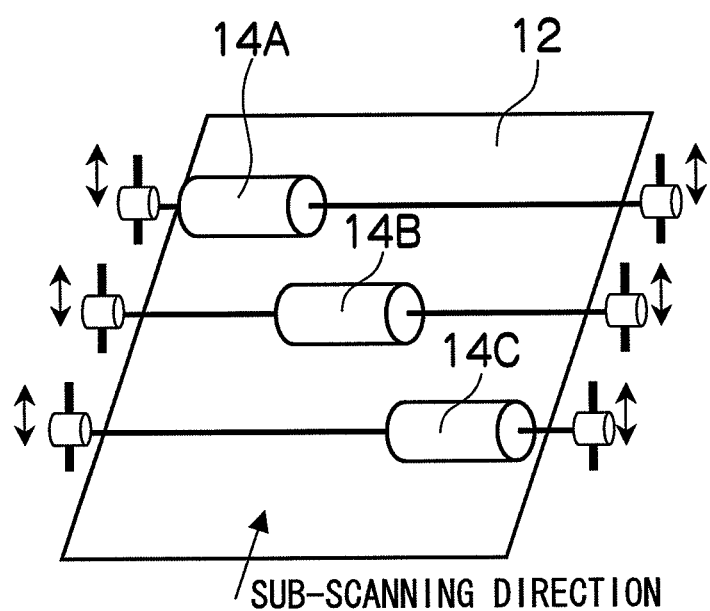
FIG. 7 shows one example of a case where the repellent agent application roller is divided into a plurality of sections in the sub-scanning direction.

Next, the number of sets (number of pairs) N of the treatment liquid dots formed by droplets deposited onto mutually adjacent pixels per unit surface area of the treatment liquid dot data is counted (step S26). Here, the "unit surface area" is the range in which deposition of the repellent agent can be selectively applied or not. For example, if the repellent agent application rollers 14A, 14B and 14C are divided into a plurality of sections in the main scanning direction (the breadthways direction of the recording medium) as shown in FIG. 7, and the application rollers 14A to 14C are composed in such a manner that they can be independently placed in contact with or separated from the recording medium 12, then the above-described "unit surface area" corresponds to the application range of each application roller in the main scanning direction, and can be set to any desired range in the sub-scanning direction. Furthermore, in the case of a non-contact application method, such as a spray method, it is possible to set the above-described "unit surface area" to any desired size in accordance with the spraying range.

FIG. 8 shows examples of the counting of the number of combinations of the treatment liquid dots. In FIG. 8, the number of combinations of the treatment liquid dots formed by the droplets deposited onto pixels that are mutually adjacent in the longitudinal direction and the lateral direction (the main scanning direction and the sub-scanning direction) are counted, then N=5 in Example A, and N=18 in Example B.

The number of combinations N of the treatment liquid dots can be counted not only for a case where there are treatment liquid dots formed by droplets deposited onto pixels that are mutually adjacent in the longitudinal direction or lateral direction, but also for a case where there are treatment liquid dots formed by droplets deposited onto pixels that are mutually adjacent in the oblique direction.

Moreover, it is also possible to apply a weighting for each direction, when the number of combinations of the treatment liquid dots is counted. In this case, desirably, the weighting is made larger in respect of the direction where there is a shorter landing time difference between the treatment liquid dots formed by the droplets deposited onto mutually adjacent pixels than the other direction. For example, if droplets are ejected by a single pass method using a matrix type head, then the landing time difference is shortest between the treatment liquid dots formed by the droplets deposited onto pixels that are mutually adjacent in the sub-scanning direction (in other words, the treatment liquid dots formed by the dropets ejected from the same nozzle), and therefore it is desirable to make the weighting in relation to the sub-scanning direction greater than the weighting in relation to the main scanning direction.

FIG. 9 shows examples of the counting of the number of combinations of the treatment liquid dots by applying weightings for the respective directions. In the present embodiment, in a case where there are treatment liquid dots formed by the droplets deposited onto pixels mutually adjacent in the sub-scanning direction, the count is incremented by +2, and in a case where there are treatment liquid dots formed by the droplets deposited onto pixels mutually adjacent in the main scanning direction, the count is incremented by +1, then N=7 in Example C, and N=26 in Example D.

There is also a mode in which the number of combinations is counted in respect of the treatment liquid dots formed by the droplets deposited onto pixels that are mutually adjacent in only one of the main scanning direction and the sub-scanning direction. In this case, a desirable mode is one where the count is made only in the direction having the shorter landing time difference between the treatment liquid dots formed by droplets deposited onto the mutually adjacent pixels. For example, in a case where droplets are deposited by a single pass method using the matrix type head as described above, it is desirable to count only the number of combinations of the treatment liquid dots formed by the droplets deposited onto the pixels mutually adjacent in the sub-scanning direction.

After calculating the number of combinations N of the treatment liquid dots as described above, the number of combinations N of the treatment liquid dots is compared with the threshold value No (step S28). If N≦N$_0$, then the repellent agent is not deposited onto that region (step S30). On the other hand, if N>N$_0$, then the repellent agent is deposited onto that region (step S32).

According to the above-described control method, by counting the number of combinations (number of pairs) of the treatment liquid dots formed by the droplets deposited onto mutually adjacent pixels, rather than simply counting the total number of the treatment liquid dots per unit surface area in the treatment liquid dot data, it is possible to select between deposition or non-deposition of the repellent agent by taking account of the state of overlap between the treatment liquid dots, by means of a simple procedure. Thus, when the number of combinations N of the treatment liquid dots is small, then the repellent agent is not deposited and therefore it is possible to avoid the problem in which the treatment liquid is prevented from permeating into the recording medium and the ink dots hence become too small so that the desired density can not be achieved. On the other hand, if the number of combinations N of the treatment liquid dots is large, then the repellent agent is deposited and therefore it is possible to prevent landing interference between the treatment liquid dots formed by the droplets deposited onto the mutually adjacent pixels and it is possible reliably to prevent non-uniformity of the treatment liquid.

In the control method shown in FIG. 6, the control is implemented in accordance with the droplet ejection data for the treatment liquid (treatment liquid dot data); however, the control method is not limited to this and a mode can also be adopted in which the decision whether or not to deposit the repellent agent is taken on the basis of the density of the input image data. Since the approximate rate of the deposition of ink dots is determined by the density of the input image data, then the rate of the deposition of the treatment liquid dots can be determined broadly and from this, the approximate degree of overlap between the treatment liquid dots can be determined. Consequently, this method is also effective for reducing non-uniformity of the treatment liquid.

Image Forming Apparatus

Figure 10:
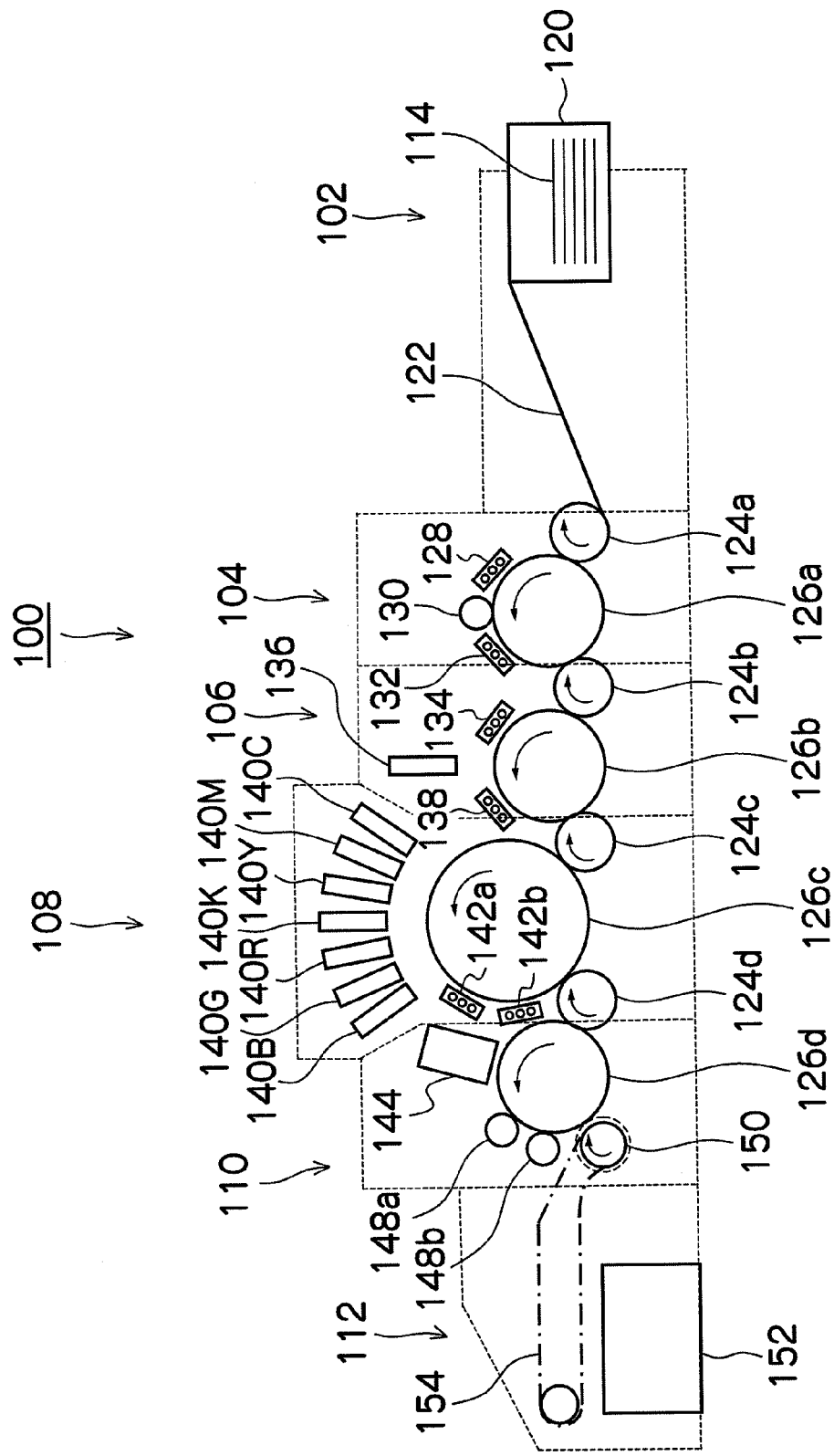
FIG. 10 is a general schematic drawing showing an inkjet recording apparatus according to an embodiment of the present invention.

FIG. 10 is a general schematic drawing showing an inkjet recording apparatus as an image forming apparatus according to an embodiment of the present invention. The inkjet recording apparatus 100 shown in FIG. 10 is a recoding apparatus that employs a two-liquid aggregation system using ink and treatment liquid (aggregating treatment liquid) to form an image on a recording medium 114.

The inkjet recording apparatus 100 includes: a paper supply unit 102, which supplies the recording medium 114; a repellent agent deposition device 104, which deposits the repellent agent on the recording medium 114; a treatment liquid deposition unit 106, which deposits the treatment liquid on the recording medium 114; an ink deposition unit (print unit) 108, which forms an image by depositing droplets of colored ink onto the recording medium 114; a fixing unit 110, which fixes the image formed on the recording medium 114; and a paper output unit 112, which conveys and outputs the recording medium 114 on which the image has been formed.

A paper supply platform 120 on which the recording media 114 are stacked is provided in the paper supply unit 102. A feeder board 122 is connected to the front (the left-hand side in FIG. 10) of the paper supply platform 120, and the recording media 114 stacked on the paper supply platform 120 are supplied one sheet at a time, successively from the uppermost sheet, to the feeder board 122. The recording medium 114 that has been conveyed to the feeder board 122 is transferred through a transfer drum 124a to a pressure drum (repellent agent drum) 126a of the repellent agent deposition device 104.

Although not shown in the drawings, holding hooks (grippers) and a suction port for holding the leading edge of the recording medium 114 are formed on the surface (circumferential surface) of the pressure drum 126a, and the recording medium 114 that has been transferred to the pressure drum 126a from the transfer drum 124a is conveyed in the direction of rotation (the counter-clockwise direction in FIG. 10) of the pressure drum 126a in a state where the leading edge is held by the holding hooks and the medium adheres tightly to the surface of the pressure drum 126a (in other words, in a state where the medium is wrapped about the pressure drum 126a). A similar composition is also employed for the other pressure drums 126b, 126c and 126d, which are described hereinafter.

The repellent agent deposition device 104 is provided with a paper preheating unit 128, a repellent agent application roller 130 and a repellent agent drying unit 132 at positions opposing the surface of the pressure drum 126a, in this order from the upstream side in terms of the direction of rotation of the pressure drum 126a (the counter-clockwise direction in FIG. 10).

Each of the paper preheating unit 128 and the repellent agent drying unit 132 is provided with a hot air drying device blowing hot air of which the temperature and flow rate can be controlled within a prescribed range. When the recording medium 114 held on the pressure drum 126a passes through the positions opposing the paper preheating unit 128 and the repellent agent drying unit 132, the hot air heated by the hot air drying devices is blown onto the surface of the recording medium 114.

The repellent agent application roller 130 applies a solution containing the repellent agent (hereinafter referred to simply as the "repellent agent") onto the recording medium 114 that is held on the pressure drum 126a. In the present embodiment, the application roller is used as the device for depositing the repellent agent onto the surface of the recording medium 114; however, there are no particular restrictions on the deposition method, and it is also possible to use various other methods, such as a spray method, inkjet method, or the like.

The treatment liquid deposition unit 106 is arranged after the repellent agent deposition device 104. A transfer drum 124b is arranged between the pressure drum (repellent agent drum) 126a of the repellent agent deposition device 104 and a pressure drum (treatment liquid drum) 126b of the treatment liquid deposition unit 106, so as to make contact with same. Hence, after the repellent agent is deposited on the recording medium 114 that is held on the pressure drum 126a of the repellent agent deposition device 104, the recording medium 114 is transferred through the transfer drum 124b to the pressure drum 126b of the treatment liquid deposition unit 106.

The treatment liquid deposition unit 106 is provided with a paper preheating unit 134, a treatment liquid ejection head 136 and a treatment liquid drying unit 138 at positions opposing the surface of the pressure drum 126b, in this order from the upstream side in terms of the direction of rotation of the pressure drum 126b (the counter-clockwise direction in FIG. 10).

The paper preheating unit 134 uses similar compositions to the above-described paper preheating unit 128 of the repellent agent deposition device 104, and detailed descriptions are omitted here. Of course, it is also possible to employ different compositions to the paper preheating unit 128.

The treatment liquid ejection head 136 ejects droplets of the treatment liquid onto the recording medium 114 that is held on the pressure drum 126b. The treatment liquid ejection head 136 adopts the same composition as ink heads 140C, 140M, 140Y, 140K, 140R, 140G and 140B of the ink deposition unit 108, which is described below.

The treatment liquid used in the present embodiment is an acidic liquid that has the action of aggregating the coloring materials contained in the inks that are ejected onto the recording medium 114 respectively from the ink heads 140C, 140M, 140Y, 140K, 140R, 140G and 140B disposed in the ink deposition unit 108, which is arranged at a downstream stage.

The treatment liquid drying unit 138 is provided with a hot air drying device blowing hot air of which the temperature and flow rate can be controlled within a prescribed range, thereby achieving a composition where the hot air heated by the hot air drying device is blown onto the treatment liquid on the recording medium 114 when the recording medium 114 that is held on the pressure drum 126b passes the position opposing the hot air drying device of the treatment liquid drying unit 138. In the present embodiment, the treatment liquid is dried by means of the hot air of 80° C.

The temperature and flow rate of the hot air drying device are set to values whereby the treatment liquid having been deposited on the recording medium 114 by the treatment liquid ejection head 136 disposed to the upstream side in terms of the direction of rotation of the pressure drum 126b is dried so that the solid or semi-solid aggregating treatment agent layer (the thin film layer of dried treatment liquid) is formed on the surface of the recording medium 114.

It is desirable that the recording medium 114 is preheated by the paper preheating unit 134, before depositing the treatment liquid on the recording medium 114, as in the present embodiment. In this case, it is possible to restrict the heating energy required to dry the treatment liquid to a low level, and therefore energy savings can be made.

The ink deposition unit 108 is arranged after the treatment liquid deposition unit 106. A transfer drum 124c is arranged between the pressure drum (treatment liquid drum) 126b of the treatment liquid deposition unit 106 and a pressure drum (print drum) 126c of the ink deposition unit (image forming drum) 108, so as to make contact with same. Hence, after the treatment liquid is deposited and the solid or semi-solid aggregating treatment agent layer is formed on the recording medium 114 that is held on the pressure drum 126b of the treatment liquid deposition unit 106, the recording medium 114 is transferred through the transfer drum 124c to the pressure drum 126c of the ink deposition unit 108.

The ink deposition unit 108 is provided with ink ejection heads 140C, 140M, 140Y, 140K, 140R, 140G and 140B, which correspond respectively to the seven colors of ink, C, M, Y, K, R, G and B, and solvent drying units 142a and 142b at positions opposing the surface of the pressure drum 126c, in this order from the upstream side in terms of the direction of rotation of the pressure drum 126c (the counter-clockwise direction in FIG. 10).

The ink ejection heads 140C, 140M, 140Y, 140K, 140R, 140G and 140B employ the inkjet type recording heads (inkjet heads), similarly to the above-described repellent agent ejection head 136. The ink ejection heads 140C, 140M, 140Y, 140K, 140R, 140G and 140B respectively eject droplets of corresponding colored inks onto the recording medium 114 held on the pressure drum 126c.

An ink storing and loading unit (not shown) is configured by ink tanks that store colored inks supplied to the ink ejection heads 140C, 140M, 140Y, 140K, 140R, 140G and 140B. Each ink tank communicates with a corresponding head through a required channel, and supplies the corresponding ink to the head. The ink storing and loading unit also includes a notification device (display device, alarm sound generator) such that when the residual amount of ink is small, the user is notified to this effect. In addition, the ink storing and loading unit includes a mechanism preventing the erroneous loading of colored inks.

The colored inks are supplied to the ink ejection heads 140C, 140M, 140Y, 140K, 140R, 140G and 140B from the tanks of the ink storing and loading unit, and droplets of the colored inks are ejected and deposited to the recording medium 114 by the ink ejection heads 140C, 140M, 140Y, 140K, 140R, 140G and 140B in accordance with the image signal.

Each of the ink ejection heads 140C, 140M, 140Y, 140K, 140R, 140G and 140B is a full-line head having a length corresponding to the maximum width of the image forming region of the recording medium 114 held on the pressure drum 126c, and having a plurality of nozzles 161 (not shown in FIG. 10 and shown in FIGS. 11A to 11C) for ejecting the ink, which are arranged on the ink ejection surface of the head through the full width of the image forming region. The ink ejection heads 140C, 140M, 140Y, 140K, 140R, 140G and 140B are arranged so as to extend in a direction that is perpendicular to the direction of rotation of the pressure drum 126c (the conveyance direction of the recording medium 114).

According to the composition in which the full line heads having the nozzle rows covering the full width of the image forming region of the recording medium 114 are provided respectively for the colors of ink, it is possible to record a primary image on the image forming region of the recording medium 114 by performing just one operation of moving the recording medium 114 and the ink ejection heads 140C, 140M, 140Y, 140K, 140R, 140G and 140DB relatively with respect to each other (in other words, by one sub-scanning action). Therefore, it is possible to achieve a higher printing speed compared to a case that uses a serial (shuttle) type of head moving back and forth reciprocally in the main scanning direction, which is the direction perpendicular to the sub-scanning direction or the conveyance direction of the recording medium 114, and hence it is possible to improve the print productivity.

The inkjet recording apparatus 100 according to the present embodiment is able to record on recording media (recording paper) up to a maximum size of 720 mm×520 mm and hence a drum having a diameter of 810 mm corresponding to the recording medium width of 720 mm is used for the pressure drum (print drum) 126c. The drum rotation peripheral speed when depositing the ink droplets is 530 mm/sec. The ink ejection volume of the ink ejection heads 140C, 140M, 140Y, 140K, 140R, 140G and 140B is 2 pl, and the recording density is 1200 dpi in both the main scanning direction (the breadthways direction of the recording medium 114) and the sub-scanning direction (the conveyance direction of the recording medium 114).

Although the configuration with the seven colors of C, M, Y, K, R, G and B is described in the present embodiment, the combinations of the ink colors and the number of colors are not limited to those. Light and/or dark inks, and special color inks can be added as required. For example, a configuration is possible in which ink heads for ejecting light-colored inks, such as light cyan and light magenta, are added. Furthermore, there is no particular restriction on the arrangement sequence of the heads of the respective colors.

Each of the solvent drying units 142a and 142b has a composition provided with a hot air drying device blowing hot air of which the temperature and flow rate can be controlled within a prescribed range, similarly to the paper pre-heating units 128 and 134, the repellent agent drying unit 132, and the treatment liquid drying unit 138, which have been described above. As described hereinafter, when ink droplets are deposited onto the solid or semi-solid aggregating treatment agent layer, which has been formed on the recording medium 114, an ink aggregate (coloring material aggregate) is formed on the recording medium 114, and furthermore, the ink solvent that has separated from the coloring material spreads, so that a liquid layer containing dissolved aggregating treatment agent is formed. The solvent component (liquid component) left on the recording medium 114 in this way is a cause of curling of the recording medium 114 and also leads to deterioration of the image. Therefore, in the present embodiment, after depositing the droplets of the colored inks from the ink ejection heads 140C, 140M, 140Y, 140K, 140R, 140G and 140B onto the recording medium 114, the hot air drying devices of the solvent drying units 142a and 142b blow the hot air of 70° C. onto the recording medium 114 so that the solvent component is evaporated off and the recording medium 114 is dried.

The fixing unit 110 is arranged after the ink deposition unit 108. A transfer drum 124d is arranged between the pressure drum (print drum) 126c of the ink deposition unit 108 and a pressure drum (fixing drum) 126d of the fixing unit 110, so as to make contact with same. Hence, after the colored inks are deposited on the recording medium 114 that is held on the pressure drum 126c of the ink deposition unit 108, the recording medium 114 is transferred through the transfer drum 124d to the pressure drum 126d of the fixing unit 110.

The fixing unit 110 is provided with a print determination unit 144, which reads in the print results of the ink deposition unit 108, and heating rollers 148a and 148b at positions opposing the surface of the pressure drum 126d, in this order from the upstream side in terms of the direction of rotation of the pressure drum 126d (the counter-clockwise direction in FIG. 10).

The print determination unit 144 includes an image sensor (a line sensor, or the like), which captures an image of the print result of the ink deposition unit 108 (the droplet ejection results of the ink ejection heads 140C, 140M, 140Y, 140K, 140R, 140G and 140B), and functions as a device for checking for nozzle blockages and other ejection defects, on the basis of the droplet ejection image captured through the image sensor.

The heating rollers 148a and 148b are rollers of which temperature can be controlled in a prescribed range (e.g., 100° C. to 180° C.), and the image formed on the recording medium 114 is fixed while nipping the recording medium 114 between the pressure drum 126c and each of the heating rollers 148a and 148b to heat and pressurize the recording medium 114. In the present embodiment, the heating temperature of the heating rollers 148a and 148b is 110C and the surface temperature of the pressure drum 126d is set to 60° C. Furthermore, the nip pressure of the heating rollers 148a and 148b is 1 MPa. Desirably, the heating temperature of the heating rollers 148a and 148b is set in accordance with the glass transition temperature of the polymer particles contained in the treatment liquid or the ink.

The paper output unit 112 is arranged after the fixing unit 110. The paper output unit 112 is provided with a paper output drum 150, which receives the recording medium 114 on which the image has been fixed, a paper output platform 152, on which the recording media 114 are stacked, and a paper output chain 154 having a plurality of paper output grippers, which is spanned between a sprocket arranged on the paper output drum 150 and a sprocket arranged above the paper output platform 152.

Next, the structure of the ink ejection heads 140C, 140M, 140Y, 140K, 140R, 140G and 140B disposed in the ink deposition unit 108 is described in detail. The ink ejection heads 140C, 140M, 140Y, 140K, 140R, 140G and 140B have a common structure, and in the following description, these ink ejection heads are represented by an ink ejection head (hereinafter, simply called a "head") denoted with reference numeral 160.

Figure 11A:
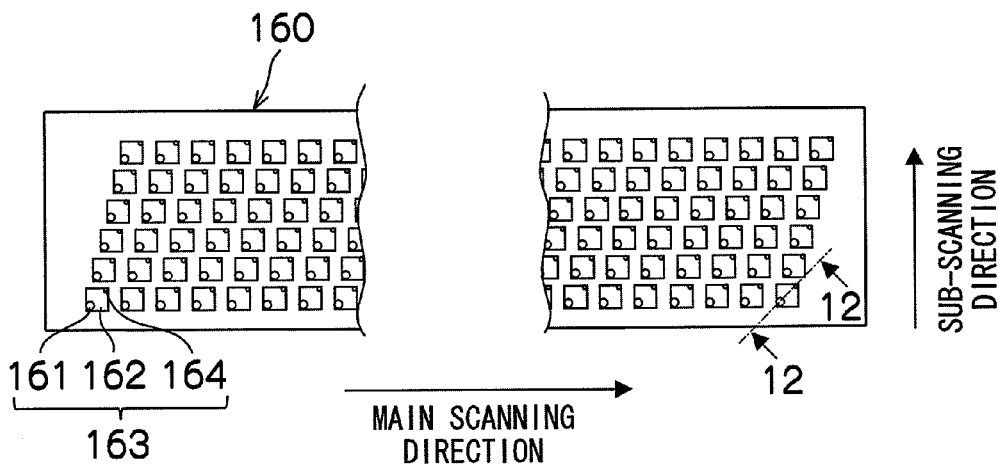
FIGS. 11A to 11C are plan view perspective diagrams showing compositions of inkjet heads.
Figure 11B:
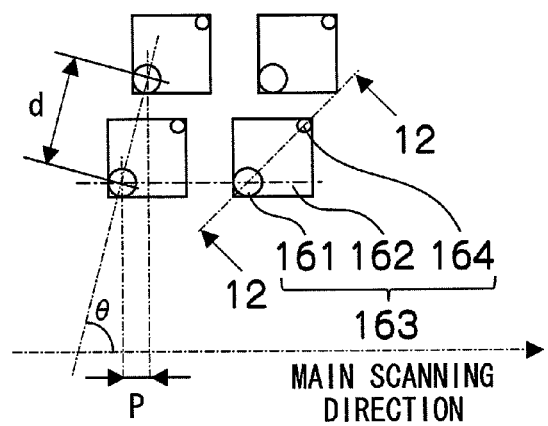
Figure 11C:
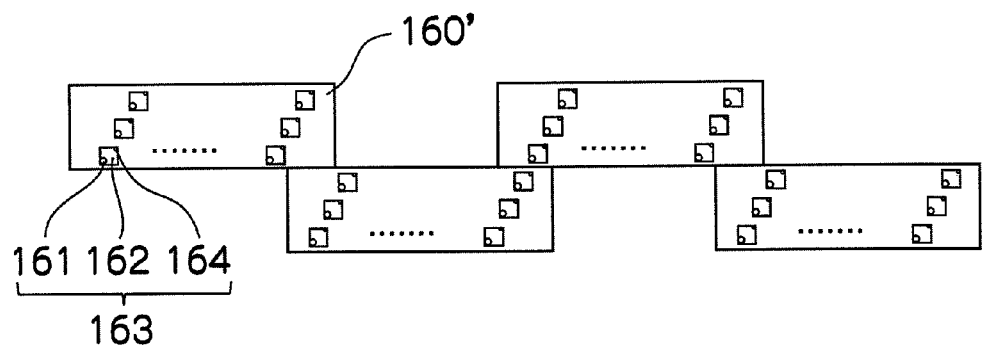
Figure 12:
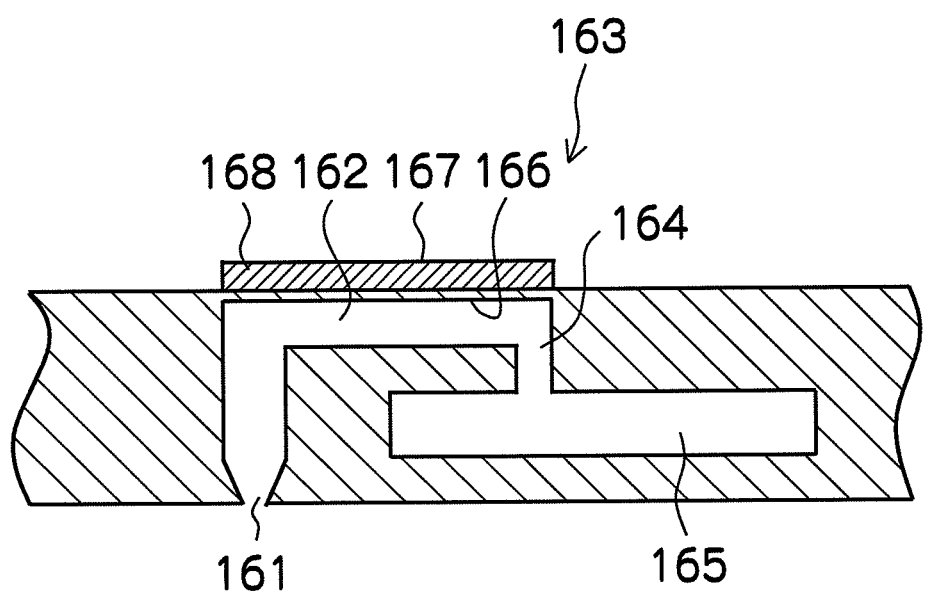
FIG. 12 is a cross-sectional diagram along line 12-12 in FIGS. 11A and 11B.

FIG. 11A is a plan view perspective diagram showing an embodiment of the structure of the head 160; FIG. 11B is an enlarged diagram showing a portion of the head; and FIG. 11C is a plan view perspective diagram showing a further embodiment of the structure of the head 160. FIG. 12 is a cross-sectional diagram along line 12-12 in FIGS. 11A and 11B, and shows the three-dimensional composition of an ink chamber unit.

The nozzle pitch in the head 160 should be minimized in order to maximize the density of the dots formed on the surface of the recording medium 114. As shown in FIGS. 11A and 11B, the head 160 according to the present embodiment has a structure in which a plurality of ink chamber units 163, each having a nozzle 161 forming an ink droplet ejection port, a pressure chamber 162 corresponding to the nozzle 161, and the like, are disposed two-dimensionally in the form of a staggered matrix, and hence the effective nozzle interval (the projected nozzle pitch) as projected in the lengthwise direction of the head (the main-scanning direction perpendicular to the recording medium conveyance direction) is reduced and high nozzle density is achieved.

The mode of forming one or more nozzle rows through a length corresponding to the entire width of the recording area of the recording medium 114 in a direction substantially perpendicular to the conveyance direction of the recording medium 114 is not limited to the embodiment described above. For example, instead of the configuration in FIG. 11A, as shown in FIG. 11C, a line head having the nozzle rows of the length corresponding to the entire width of the recording area of the recording medium 114 can be formed by arranging and combining, in a staggered matrix, short head blocks 160' each having a plurality of nozzles 161 analyzed two-dimensionally. Furthermore, although not shown in the drawings, it is also possible to compose a line head by arranging short heads in one row.

The pressure chamber 162 provided corresponding to each of the nozzles 161 is approximately square-shaped in plan view, and the nozzle 161 and a supply port 164 are arranged respectively at corners on a diagonal of the pressure chamber 162. Each pressure chamber 162 is connected through the supply port 164 to a common flow channel 165. The common flow channel 165 is connected to an ink supply tank (not shown), which is a base tank that supplies ink, and the ink supplied from the ink supply tank is delivered through the common flow channel 165 to the pressure chambers 162.

A piezoelectric element 168 provided with an individual electrode 167 is bonded to a diaphragm 166, which forms the upper face of the pressure chamber 162 and also serves as a common electrode, and the piezoelectric element 168 is deformed when a drive voltage is applied to the individual electrode 167, thereby causing the ink to be ejected from the nozzle 161. When the ink is ejected, new ink is supplied to the pressure chamber 162 from the common flow passage 165 through the supply port 164.

In the present embodiment, the piezoelectric element 168 is used as an ink ejection force generating device, which causes the ink to be ejected from the nozzle 160 in the head 161; however, it is also possible to employ a thermal method in which a heater is provided inside the pressure chamber 162 and the ink is ejected by using the pressure of the film boiling action caused by the heating action of this heater.

As shown in FIG. 11B, the high-density nozzle head according to the present embodiment is achieved by arranging the plurality of ink chamber units 163 having the above-described structure in a lattice fashion based on a fixed arrangement pattern, in a row direction that coincides with the main scanning direction, and a column direction that is inclined at a fixed angle of θ with respect to the main scanning direction, rather than being perpendicular to the main scanning direction.

More specifically, by adopting the structure in which the plurality of ink chamber units 163 are arranged at the uniform pitch d in line with the direction forming the angle of θ with respect to the main scanning direction, the pitch P of the nozzles projected so as to align in the main scanning direction is d×cos θ, and hence the nozzles 161 can be regarded to be equivalent to those arranged linearly at the fixed pitch P along the main scanning direction. Such configuration results in the nozzle structure in which the nozzle row projected in the main scanning direction has a high nozzle density of up to 2,400 nozzles per inch.

When implementing the present invention, the arrangement structure of the nozzles is not limited to the embodiment shown in the drawings, and it is also possible to apply various other types of nozzle arrangements, such as an arrangement structure having one nozzle row in the sub-scanning direction.

Furthermore, the scope of application of the present invention is not limited to a printing system based on the line type of head, and it is also possible to adopt a serial system where a short head that is shorter than the breadthways dimension of the recording medium 114 is moved in the breadthways direction (main scanning direction) of the recording medium 114, thereby performing printing in the breadthways direction, and when one printing action in the breadthways direction has been completed, the recording medium 114 is moved through a prescribed amount in the sub-scanning direction perpendicular to the breadthways direction, printing in the breadthways direction of the recording medium 114 is carried out in the next printing region, and by repeating this sequence, printing is performed over the whole surface of the printing region of the recording medium 114.

Figure 13:
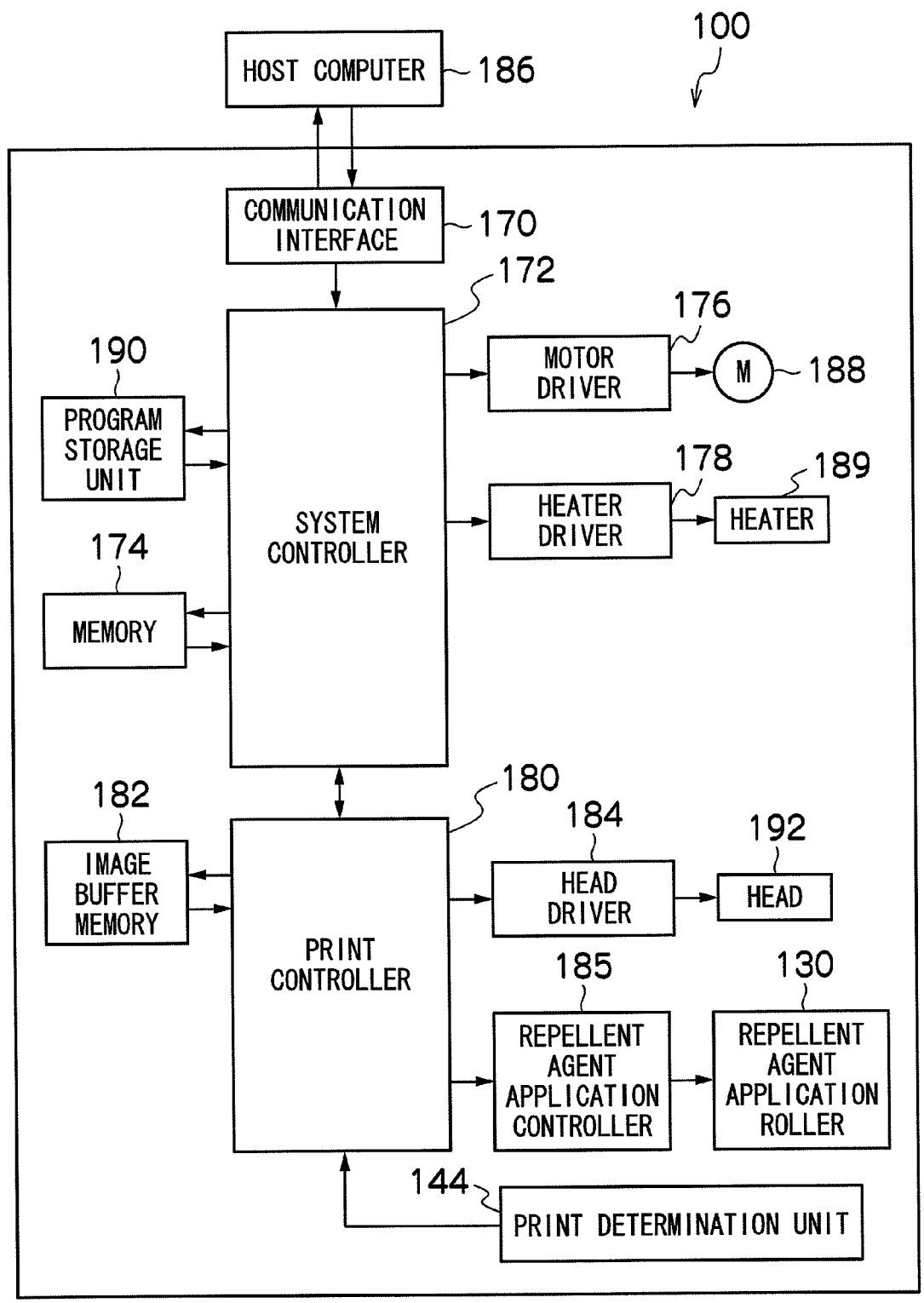
FIG. 13 a principal block diagram showing a system configuration of the inkjet recording apparatus shown in FIG. 10.
Figure 14:
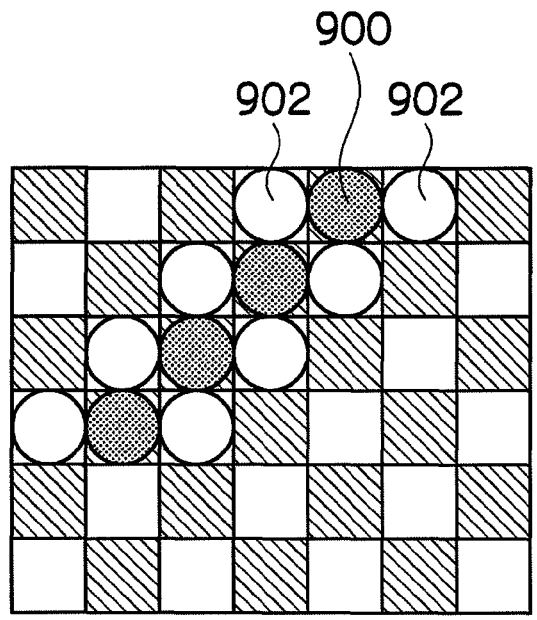
FIG. 14 is a diagram showing a case where lines are formed in an oblique direction in the related art.

FIG. 13 is a principal block diagram showing the system configuration of the image forming apparatus 100. The image forming apparatus 100 includes a communication interface 170, a system controller 172, a memory 174, a motor driver 176, a heater driver 178, a print controller 180, an image buffer memory 182, a head driver 184, a repellent agent deposition controller 185, and the like.

The communication interface 170 is an interface unit for receiving image data sent from a host computer 186. A serial interface such as USB (Universal Serial Bus), IEEE1394, Ethernet, wireless network, or a parallel interface such as a Centronics interface may be used as the communication interface 170. A buffer memory (not shown) may be mounted in this portion in order to increase the communication speed. The image data sent from the host computer 186 is received by the image forming apparatus 100 through the communication interface 170, and is temporarily stored in the memory 174.

The memory 174 is a storage device for temporarily storing image data inputted through the communication interface 170, and data is written and read to and from the memory 174 through the system controller 172. The memory 174 is not limited to a memory composed of semiconductor elements, and a hard disk drive or another magnetic medium may be used.

The system controller 172 is constituted of a central processing unit (CPU) and peripheral circuits thereof, and the like, and it functions as a control device for controlling the whole of the image forming apparatus 100 in accordance with a prescribed program, as well as a calculation device for performing various calculations. More specifically, the system controller 172 controls the various sections, such as the communication interface 170, memory 174, motor driver 176, heater driver 178, and the like, as well as controlling communications with the host computer 186 and writing and reading to and from the memory 174, and it also generates control signals for controlling the motor 188 and heater 189 of the conveyance system.

The program executed by the CPU of the system controller 172 and the various types of data which are required for control procedures are stored in the memory 174. The memory 174 may be a non-rewriteable storage device, or it may be a rewriteable storage device, such as an EEPROM. The memory 174 is used as a temporary storage region for the image data, and it is also used as a program development region and a calculation work region for the CPU.

Various control programs are stored in the program storage unit 190, and a control program is read out and executed in accordance with commands from the system controller 172. The program storage unit 190 may use a semiconductor memory, such as a ROM, EEPROM, or a magnetic disk, or the like. An external interface may be provided, and a memory card or PC card may also be used. Naturally, a plurality of these recording media may also be provided. The program storage unit 190 may also be combined with a storage device for storing operational parameters, and the like (not shown).

The motor driver 176 is a driver that drives the motor 188 in accordance with instructions from the system controller 172. In FIG. 13, the plurality of motors (actuators) disposed in the respective sections of the image forming apparatus 100 are represented by the reference numeral 188. For example, the motor 188 shown in FIG. 13 includes the motors that drive the pressure drums 126a to 126d, the transfer drums 124a to 124d and the paper output drum 150, shown in FIG. 10.

The heater driver 178 is a driver that drives the heater 189 in accordance with instructions from the system controller 172. In FIG. 13, the plurality of heaters disposed in the image forming apparatus 100 are represented by the reference numeral 189. For example, the heater 189 shown in FIG. 13 includes the heaters of the paper preheating units 128 and 134, the repellent agent drying unit 132, the treatment liquid drying unit 138, the solvent drying units 142a and 142b, and the like, shown in FIG. 10.

The print controller 180 is a control unit that has signal processing functions for carrying out processing, correction, and other treatments in order to generate a print control signal on the basis of the image data in the memory 174 in accordance with the control of the system controller 172. The print controller 180 supplies the print data (dot data) thus generated to the head driver 184. Prescribed signal processing is carried out in the print controller 180, and the ejection volume and the ejection timing of the ink droplets in the head 160 are controlled through the head driver 184 on the basis of the image data. By this means, prescribed dot size and dot positions can be achieved. In FIG. 13, the plurality of heads (inkjet heads) disposed in the inkjet recording apparatus 100 are represented by the reference numeral 192. For example, the head 192 shown in FIG. 13 includes the ink ejection heads 140C, 140M, 140Y, 140K, 140R, 140G and 140B shown in FIG. 10. The print controller 180 also serves as a controller that controls the deposition of the treatment liquid.

The print controller 180 is provided with the image buffer memory 182, and image data, parameters, and other data are temporarily stored in the image buffer memory 182 when image data is processed in the print controller 180. Also possible is an aspect-in which the print controller 180 and the system controller 172 are integrated to form a single processor.

The head driver 184 generates drive signals to be applied to the piezoelectric elements 168 of the head 192, on the basis of image data supplied from the print controller 180, and also has drive circuits which drive the piezoelectric elements 168 by applying the drive signals to the piezoelectric elements 168. A feedback control system for maintaining constant drive conditions in the head 192 may be included in the head driver 184 shown in FIG. 13.

The repellent agent deposition controller 185 controls the amount of the repellent agent applied by the repellent agent application roller 130 in accordance with instructions from the print controller 180. In the present embodiment, it is possible to move the repellent agent application roller 130 to be in contact with and separated from the recording medium 114 held on the pressure drum 126a, so that the application amount of the repellent agent is controlled by adjusting the time period in which the repellent agent application roller 130 is in contact with the recording medium 114.

The print determination unit 144 is a block that includes the line sensor as described above with reference to FIG. 10, reads the image printed on the recording medium 114, determines the print conditions (presence of the ejection, variation in the dot formation, and the like) by performing desired signal processing, or the like, and provides the determination results of the print conditions to the print controller 180. According to requirements, the print controller 180 makes various corrections with respect to the head 192 on the basis of information obtained from the print determination unit 144.

The operation of the image forming apparatus 100 which has this composition is described below.

The recording medium 114 is conveyed to the feeder board 122 from the paper supply platform 120 of the paper supply unit 102, and is transferred through the transfer drum 124a onto the pressure drum 126a of the repellent agent deposition unit 104. The recording medium 114 held on the pressure drum 126a is preheated by the paper preheating unit 128, and is applied with the repellent agent by the repellent agent application roller 130. Thereupon, the recording medium 114 held on the pressure drum 126a is heated by the repellent agent drying unit 132, and the solvent component (liquid component) of the repellent agent is evaporated and the recording medium 114 is thereby dried.

The recording medium 114 of which the surface has been rendered liquid-repellent is transferred from the pressure drum 126a of the repellent deposition unit 104 through the transfer drum 124b to the pressure drum 126b of the treatment liquid deposition unit 106. The recording medium 114 held on the pressure drum 126b is preheated by the paper preheating unit 134 and droplets of the treatment liquid are deposited by the treatment liquid head 136. Thereupon, the recording medium 114 held on the pressure drum 126b is heated by the treatment liquid drying unit 138, and the solvent component (liquid component) of the treatment liquid is evaporated and the recording medium 114 is thereby dried. Thus, a solid or semi-solid aggregating treatment agent layer is formed on the recording medium 114.

The recording medium 114 on which the solid or semi-solid aggregating treatment agent layer has been formed is transferred from the pressure drum 126b of the treatment liquid deposition unit 106 though the transfer drum 124c to the pressure drum 126c of the ink deposition unit 108. Droplets of corresponding colored inks are ejected respectively from the ink ejection heads 140C, 140M, 140Y, 140K, 140R, 140G and 140B, onto the recording medium 114 held on the pressure drum 126c, in accordance with the input image data.

The ink droplets ejected from the heads 140C, 140M, 140Y, 140K, 140R, 140G and 140B are deposited onto the solid or semi-solid aggregating treatment agent layer formed on the recording medium 114. At this time, the contact interface between each ink droplet and the aggregating treatment agent layer has a prescribed area when the ink droplet lands, due to a balance between the kinetic energy and the surface energy. The aggregating reaction starts immediately after the ink droplets have landed on the aggregating treatment agent, and the aggregating reaction starts from the surface of each ink droplet in contact with the aggregating treatment agent layer. Since the aggregating reaction occurs only in the vicinity of the contact surface, and the coloring material in the ink aggregates while the ink droplet obtains an adhesive force in the prescribed contact interface area upon landing of the ink droplet, then movement of the coloring material is suppressed.

Even if another ink droplet is subsequently deposited adjacently to the ink droplet deposited previously, since the coloring material of the previously deposited ink has already aggregated, then the coloring material does not mix with the subsequently deposited ink, and therefore bleeding is suppressed. After the aggregation of the coloring material, the separated ink solvent spreads, and a liquid layer containing dissolved aggregating treatment agent is formed on the recording medium 114.

Thereupon, the recording medium 114 held on the pressure drum 126c is heated by the solvent drying units 142a and 142b, and the solvent component (liquid component) that has been separated from the ink aggregate on the recording medium 114 is evaporated off and the recording medium 114 is thereby dried. Thus, curling of the recording medium 114 is prevented, and furthermore deterioration of the image quality as a result of the presence of the solvent component can be restricted.

The recording medium 114 onto which the colored inks have been deposited by the ink deposition unit 108 is transferred from the pressure drum 126c of the ink deposition unit 108 through the transfer drum 124d to the pressure drum 126d of the fixing unit 110. The print results produced by the print unit 108 on the recording medium 114 held on the pressure drum 126d are read in by the print determination unit 144, whereupon the recording medium 114 is heated and pressured by the heating rollers 148a and 148b to fix the image formed on the recording medium 114.

Then, the recording medium 114 on which the image has been fixed is transferred from the pressure drum 126d to the paper output drum 150. The recording medium 114 is then conveyed onto the paper output platform 152 by the paper output chain 154, and is stacked on the paper output platform 152.

As described above, according to the present embodiment, it is possible to suppress wetting and spreading of the treatment liquid droplets that have landed on the recording medium by rendering the surface of the recording medium liquid-repellent before depositing the droplets of the treatment liquid thereon, and therefore landing interference between the droplets of the treatment liquid can be prevented. It is thereby possible to deposit the droplets of the treatment liquid at the same droplet deposition density as the ink droplets, rather than thinning out the treatment liquid droplets, and hence an image of high quality that does not contain image bleeding can be achieved.

Furthermore, by depositing droplets of the ink after forming the solid or semi-solid aggregating agent layer on the surface of the recording medium, it is possible to prevent image deterioration due to movement of the coloring material (floating of the dots).

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus which forms an image on a surface of a recording medium by using ink and treatment liquid, the ink containing coloring material, the treatment liquid containing at least one of a component which aggregates the coloring material and a component which increases viscosity of the ink, the apparatus comprising:
    a repellent agent deposition device which deposits a repellent agent onto the recording medium to render the surface of the recording medium liquid-repellent;
    a treatment liquid droplet ejection device which ejects and deposits droplets of the treatment liquid onto the recording medium on which the repellent agent has been deposited, the deposited droplets of the treatment liquid forming dots of the treatment liquid on the recording medium;
    an ink droplet ejection device which ejects and deposits droplets of the ink onto the recording medium on which the dots of the treatment liquid have been formed;
    a repellent agent deposition control device which controls a deposition volume of the repellent agent deposited by the repellent agent deposition device in such a manner that the dots of the treatment liquid are not in contact with each other; and
    a wettability parameter input device which inputs a wettability parameter specifying wettability of the treatment liquid with respect to the recording medium, wherein
    the repellent agent deposition control device controls the deposition volume of the repellent agent in accordance with the wettability parameter, and
    the wettability parameter includes a diameter of each of the dots of the treatment liquid on the recording medium.

2. The image forming apparatus as defined in claim 1, wherein the repellent agent deposition control device controls the deposition volume of the repellent agent in such a manner that:
    when $D<Pt$, the deposition volume of the repellent agent is zero, where D is the diameter of each of the dots of the treatment liquid on the recording medium, and Pt is an interval between the dots of the treatment liquid on the recording medium;
    when $Pt \leqq D < \sqrt{2} \times Pt$, the deposition volume of the repellent agent is V1; and
    when $\sqrt{2} \times Pt \leqq D$, the deposition volume of the repellent agent is V2 that is larger than V1.

* * * * *